US011003925B2

(12) United States Patent
Hayashi et al.

(10) Patent No.: US 11,003,925 B2
(45) Date of Patent: May 11, 2021

(54) EVENT PREDICTION SYSTEM, EVENT PREDICTION METHOD, PROGRAM, AND RECORDING MEDIUM HAVING SAME RECORDED THEREIN

(71) Applicant: Panasonic Intellectual Property Management Co., Ltd., Osaka (JP)

(72) Inventors: Shohei Hayashi, Kyoto (JP); Toshiya Mori, Osaka (JP); Tadashi Shibata, Osaka (JP); Nobuyuki Nakano, Aichi (JP); Masanaga Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 7 days.

(21) Appl. No.: 16/512,328

(22) Filed: Jul. 15, 2019

(65) Prior Publication Data

US 2019/0340448 A1 Nov. 7, 2019

Related U.S. Application Data

(63) Continuation of application No. PCT/JP2018/001112, filed on Jan. 17, 2018.

(30) Foreign Application Priority Data

Jan. 23, 2017 (JP) .............................. JP2017-009545
Jan. 23, 2017 (JP) .............................. JP2017-009546

(51) Int. Cl.
*G06K 9/00* (2006.01)
*G06N 20/00* (2019.01)
(Continued)

(52) U.S. Cl.
CPC ..... *G06K 9/00805* (2013.01); *G06K 9/00825* (2013.01); *G06K 9/6256* (2013.01); *G06N 3/08* (2013.01); *G06N 20/00* (2019.01)

(58) Field of Classification Search
CPC ........... G06K 9/00805; G06K 9/00825; G06K 9/6256; G06K 9/00671; G06N 20/00;
(Continued)

(56) References Cited

U.S. PATENT DOCUMENTS

2013/0223686 A1* 8/2013 Shimizu ................. G08G 1/166
382/103
2015/0344030 A1 12/2015 Damerow et al.
(Continued)

FOREIGN PATENT DOCUMENTS

JP 2001-351057 12/2001
JP 2008-003707 1/2008
(Continued)

OTHER PUBLICATIONS

Japanese Office Action dated Jan. 14, 2020 for Japanese Patent Application No. 2017-009546.
(Continued)

*Primary Examiner* — Amandeep Saini
(74) *Attorney, Agent, or Firm* — Greenblum & Bernstein, P.L.C.

(57) ABSTRACT

An event prediction system includes an accumulation unit and a generator. The accumulation unit accumulates a plurality of pieces of learning data each including history information representing a situation of a mobile object upon occurrence of an event associated with driving of the mobile object. The generator generates a prediction model for prediction of relative coordinates of an occurrence place of the event relative to the mobile object by using the plurality of pieces of learning data. Each of the plurality of pieces of learning data further includes label information representing the relative coordinates of the occurrence place of the event relative to the mobile object.

8 Claims, 9 Drawing Sheets

(51) Int. Cl.
*G06K 9/62* (2006.01)
*G06N 3/08* (2006.01)

(58) Field of Classification Search
CPC .......... G06N 3/08; B60W 40/08; G08G 1/00; G08G 1/16
USPC ........................................................ 382/103
See application file for complete search history.

(56) References Cited

U.S. PATENT DOCUMENTS

| | | | |
|---|---|---|---|
| 2016/0159366 | A1 | 6/2016 | Tsuyunashi et al. |
| 2017/0316180 | A1 | 11/2017 | Takeda et al. |
| 2017/0323568 | A1 | 11/2017 | Inoue et al. |

FOREIGN PATENT DOCUMENTS

| | | | | |
|---|---|---|---|---|
| JP | 2009-092774 | | 4/2009 | |
| JP | 2009-277059 | | 11/2009 | |
| JP | 2011-203795 | | 10/2011 | |
| JP | 2011203795 | A * | 10/2011 | |
| JP | 2012-014257 | A | 1/2012 | |
| JP | 2012-128655 | | 7/2012 | |
| JP | 2012-243165 | A | 12/2012 | |
| JP | 2013-544696 | | 12/2013 | |
| JP | 2015-228204 | | 12/2015 | |
| JP | 2016-091039 | | 5/2016 | |
| JP | 2016-099834 | A | 5/2016 | |
| JP | 2016-110449 | A | 6/2016 | |
| JP | 5977898 | B | 8/2016 | |
| WO | 2012/033173 | | 3/2012 | |
| WO | 2012/047977 | | 4/2012 | |
| WO | WO-2017171082 | A1 * | 10/2017 | ............... G08G 1/16 |

OTHER PUBLICATIONS

Notice of Reasons for Refusal in Japan dated Dec. 3, 2019 for Japanese Patent Application No. 2017-009545.
Japanese Office Action dated Apr. 7, 2020 for the related Japanese Patent Application No. 2017-009545.
Japanese Office Action dated Apr. 7, 2020 for the related Japanese Patent Application No. 2017-009546.
International Search Report of PCT application No. PCT/JP2018/001112 dated Feb. 13, 2018.
Japanese Office Action dated Dec. 1, 2020 for the related Japanese Patent Application No. 2017-009546.

* cited by examiner

EVENT PREDICTION SYSTEM, EVENT PREDICTION METHOD, PROGRAM, AND RECORDING MEDIUM HAVING SAME RECORDED THEREIN

CROSS-REFERENCE TO RELATED APPLICATIONS

This application is a U.S. national stage application of the PCT International Application No. PCT/JP2018/001112 filed on Jan. 17, 2018, which claims the benefit of foreign priority of Japanese patent application No. 2017-009545 filed on Jan. 23, 2017 and Japanese patent application No. 2017-009546 filed on Jan. 23, 2017, the contents all of which are incorporated herein by reference.

BACKGROUND

1. Technical Field

The present disclosure relates to an event prediction system, an event prediction method, a program, and a recording medium having the same recorded therein. More specifically, the present disclosure relates to a technique of predicting occurrence of events associated with driving of a mobile object.

2. Description of the Related Art

Conventionally, a driving assistance apparatus is known (see, for example, Unexamined Japanese Patent Publication No. 2012-128655), which assists driving of a vehicle by predicting danger to the own vehicle and notifying a driver of a prediction result.

The driving assistance apparatus disclosed in Unexamined Japanese Patent Publication No. 2012-128655 includes a driving ability checking unit, a danger predicting unit, and a display controller. The driving ability checking unit periodically conducts a driving skill test on the basis of detection information from an environment information acquisition unit, an own vehicle information acquisition unit, and a driver information acquisition unit, and checks driving ability of a driver by determining driving behavior of the driver from the test result. The danger prediction unit performs danger prediction of the own vehicle on the basis of a determination result on the driving behavior of the driver. The display controller predicts a future position of the own vehicle on the basis of detection information from the environment information acquisition unit, the own vehicle information acquisition unit, and the driver information acquisition unit. The display controller then causes a display unit to display the future position of the own vehicle in a display form corresponding to collision danger-degree of the own vehicle.

SUMMARY

However, the driving assistance apparatus disclosed in Unexamined Japanese Patent Publication No. 2012-128655 notifies the driver of a collision possibility by displaying a prediction result on the future position of the own vehicle. Information that can be notified to the driver is limited to events that occur within a visibility range of the driver. Events include accidents and future situations that may lead to accidents. Accordingly, the driving assistance apparatus disclosed in Unexamined Japanese Patent Publication No. 2012-128655 cannot predict events originating from objects such as pedestrians in blind spots of the driver, for example, a pedestrian who rushes out from behind a vehicle parked on a road.

The present disclosure provides an event prediction system that can also predict occurrence of events originating from objects in blind spots of a driver, an event prediction method, a program, and a recording medium having the same recorded therein.

An event prediction system according to an aspect of the present disclosure includes an accumulation unit and a generator. The accumulation unit accumulates a plurality of pieces of learning data each including history information representing a situation of a mobile object upon occurrence of an event associated with driving of the mobile object. The generator generates a prediction model for predicting relative coordinates of an occurrence place of the event relative to the mobile object by using these pieces of learning data. Each of the plurality of pieces of learning data further includes label information representing the relative coordinates of the occurrence place of the event relative to the mobile object.

An event prediction method according to an aspect of the present disclosure includes accumulating a plurality of pieces of learning data each including history information representing a situation of a mobile object upon occurrence of an event associated with driving of the mobile object, and generating a prediction model using the plurality of pieces of learning data. The prediction model is a model for predicting relative coordinates of an occurrence place of the event relative to the mobile object. Each of the plurality of pieces of learning data further includes label information representing the relative coordinates of the occurrence place of the event relative to the mobile object.

A program according to an aspect of the present disclosure is a program for causing a computer system to execute an accumulation process and a generation process. The accumulation process includes accumulating a plurality of pieces of learning data each including history information representing a situation of a mobile object upon occurrence of an event associated with driving of the mobile object. The generation process includes generating a prediction model for predicting relative coordinates of an occurrence place of the event by using the plurality of pieces of learning data. Each of the plurality of pieces of learning data further includes label information representing the relative coordinates of the occurrence place of the event relative to the mobile object.

The above program is recorded on a non-transient recording medium according to an aspect of the present disclosure.

According to the present disclosure, it is possible to predict occurrence of an event originating from a target object in a blind spot of a driver.

DETAILED DESCRIPTION OF PREFERRED EMBODIMENTS

Figure 1:
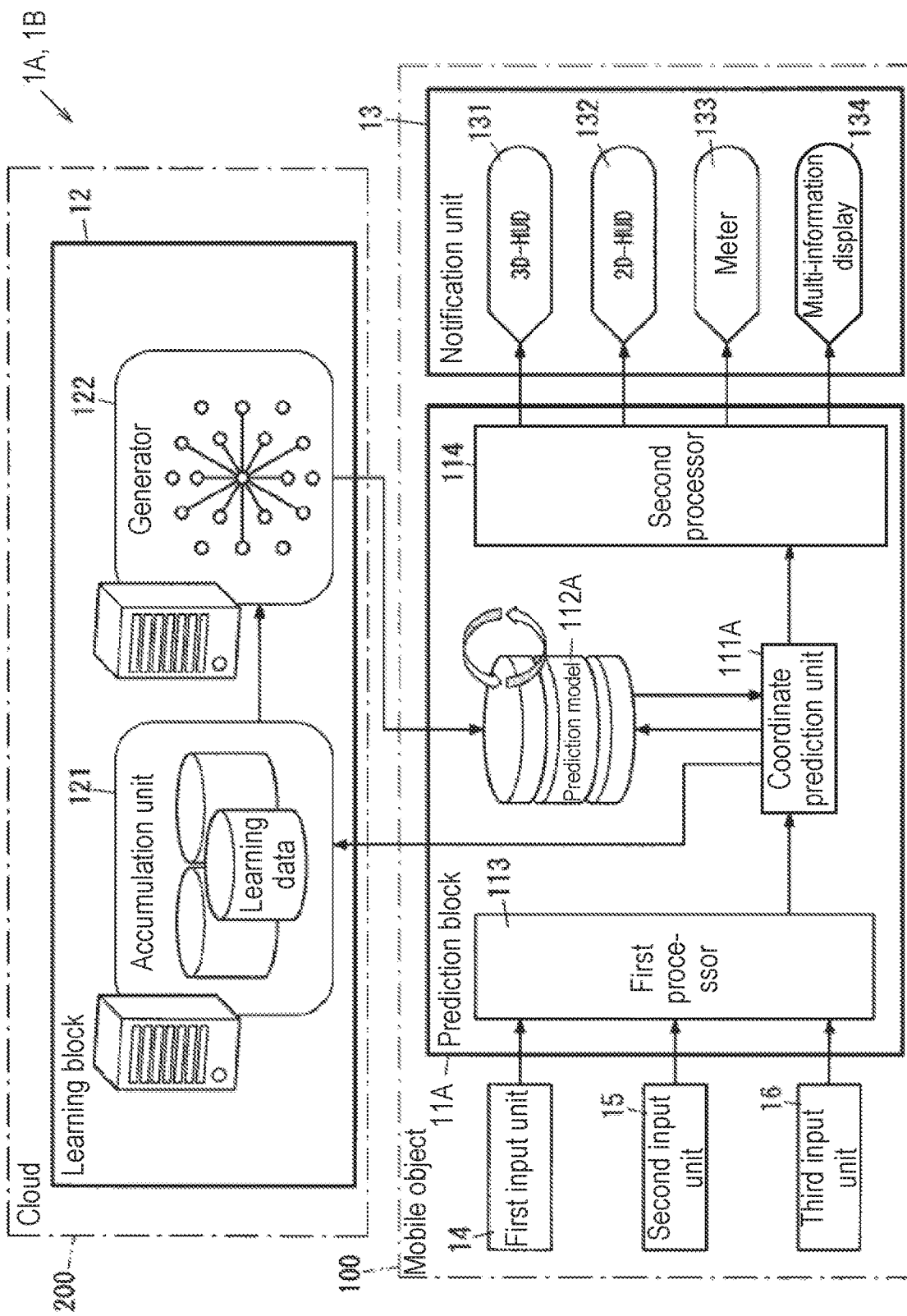
FIG. 1 is a block diagram showing a configuration of an event prediction system according to a first exemplary embodiment of the present disclosure.

Various types of event prediction systems according to exemplary embodiments of the present disclosure predict occurrence of an event associated with driving of a mobile object such as an automobile. The following is a case in which a mobile object to which the event prediction system is applied is an automobile.

The "event" means an event felt dangerous by a driver of the mobile object at the time of driving, for example. Such types of "events" include, for example, accidents such as collision between vehicles, collision of a vehicle with a structure such as a guardrail, and contact between a pedestrian or the like and a vehicle or events that are not accidents themselves but are likely to directly lead to accidents. In addition, an "occurrence place of an event" includes both a place (site) such as an intersection or crosswalk where an event occurs and a specific object (portion) such as a vehicle, pedestrian, or small animal which is located adjacent to the mobile object and subjected to the event.

An event prediction system according to the exemplary embodiments of the present disclosure mainly predicts occurrence of an event originating from a target object in a blind spot of a driver. Specific examples of such types of events include rushing out of a pedestrian from behind a vehicle parked on a road and rushing out of a vehicle running straight from behind a vehicle waiting to turn right or left. Such types of events that occur outside a visibility range of a driver are also called "invisible dangers". A driver of a mobile object generally predicts such a type of event based on a current situation of the mobile object, his/her experiences, and the like. That is, in general, the driver acquires ability to predict "invisible dangers" to some extent by experiencing driving of the mobile object in various situations. Accordingly, predictability of "invisible dangers" sometimes greatly varies depending on a level of driving skill of the driver, innate sense of driving, conditions of the driver (including a mental condition of the driver), and the like.

The event prediction system mainly predicts such types of events, and hence can reduce variations in predictability of "invisible dangers" due to a level of driving skill of the driver, innate sense of driving, conditions of the driver, and the like. Accordingly, for example, even a relatively less experienced driver can drive in consideration of possibility of occurrence of such types of events. In addition, for example, even a driver whose concentration is lower than usual due to, for example, fatigue and lack of sleep can drive in consideration of possibility of occurrence of such types of events. Furthermore, when, for example, a driver simply looks away or becomes distracted, he/she can be delayed in recognition of occurrence of an event. In such a situation, the driver can quickly recognize possibility of occurrence of an event, and hence can drive more safely. As described above, the event prediction system according to the exemplary embodiments of the present disclosure can predict occurrence of even events originating from target objects in blind spots of a driver, and can assist driving of a mobile object by the driver.

Such an event prediction system predicts occurrence of an event from, for example, history information representing situations of a mobile object at the time of actual occurrence of events by using a prediction model generated by a machine learning algorithm. That is, instead of driving experiences of a driver, a prediction model generated from, for example, history information representing situations of a mobile object can predict occurrence of an event. The prediction model can predict occurrence of an event from various situations of a mobile object, such as what kinds of objects exist around the mobile object, how fast the mobile object is moving, and where the mobile object is moving.

For example, a head-up display (HUD) and a multi-information display preferably notify the driver by displaying an event prediction result in the event prediction system. This notifies the driver of prediction of occurrence of an event originating from a target object in a blind spot of the driver upon prediction of the occurrence of the event.

Various exemplary embodiments of the present disclosure will be described below with reference to the accompanying drawings. Note that in each of the exemplary embodiments, the same components as those of the preceding exemplary embodiments are denoted by the same reference numerals, and the detailed description may be omitted.

First Exemplary Embodiment (1) Configuration

FIG. 1 is a block diagram showing a configuration of event prediction system 1A according to a first exemplary embodiment of the present disclosure. Event prediction system 1A includes prediction block 11A implemented in mobile object 100 and learning block 12 implemented in cloud 200 (cloud computing). This exemplary embodiment will exemplify a case in which mobile object 100 is an automobile.

Event prediction system 1A may further include notification unit 13 mounted in mobile object 100. Event prediction system 1A further includes first input unit 14, second input unit 15, and third input unit 16 mounted in mobile object 100.

Prediction block 11A and learning block 12 are configured to be communicative with each other. Prediction block 11A is implemented in mobile object 100, and hence communicates with learning block 12 implemented in cloud 200 via, for example, a mobile telephone network (carrier network) provided by a telecommunications carrier or a public circuit network such as the Internet. Mobile telephone networks include, for example, a 3rd generation (3G) line and a long term evolution (LTE) line. Prediction block 11A may be configured to be communicative with learning block 12 via a public wireless local area network (LAN).

Prediction block 11A includes coordinate prediction unit 111A, model storage unit 112A, first processor 113, and second processor 114. Prediction block 11A is formed from a computer system including, for example, a central processing unit (CPU) and a memory as main components. The CPU executes a program stored in the memory to make the computer system function as prediction block 11A. The program is recorded in the memory of prediction block 11A in advance, but may be provided via an electric communication line such as the Internet or by being recorded in a recording medium such as a memory card.

First processor 113 is connected to first input unit 14, second input unit 15, and third input unit 16 and acquires mobile object information. The "mobile object information" is information representing a situation of mobile object 100. According to this exemplary embodiment, mobile object information includes at least one of information (also called "advanced driver assistance system (ADAS) information") concerning an object adjacent to mobile object 100, information (also called "vehicle information") concerning a condition of mobile object 100, and information (also called "position information") concerning a position of mobile object 100. First input unit 14, second input unit 15, and third input unit 16 are respectively input interfaces for ADAS information, vehicle information, and position information. Accordingly, first processor 113 receives the ADAS information from first input unit 14, the vehicle information from second input unit 15, and the position information from third input unit 16.

First processor 113 serving as an input information processor outputs the ADAS information, the vehicle information, and the position information as mobile object information to coordinate prediction unit 111A. In addition, first processor 113 outputs the ADAS information, the vehicle information, and the position information as prediction information or history information (to be described later) to coordinate prediction unit 111A. That is, in this exemplary embodiment, the mobile object information, the prediction information, and the history information each are information including all of the ADAS information, the vehicle information, and the position information.

The ADAS information can be detected by a camera, sonar sensor, radar, light detection and ranging (LiDAR), or the like serving as a detector of an advanced driving assistance system. Specific examples of the ADAS information include a distance from mobile object 100 to a vehicle running adjacent to mobile object 100, relative coordinates of the vehicle relative to mobile object 100, distances between a plurality of vehicles, and relative velocities between the vehicles. Objects adjacent to mobile object 100 in the ADAS information include a vehicle running or at rest adjacent mobile object 100, a structure such as a guardrail, a pedestrian, and a small animal.

The vehicle information is information representing a local condition of mobile object 100 itself and can be detected by a sensor mounted in mobile object 100. Specific examples of the vehicle information include a moving velocity (traveling velocity) of mobile object 100, acceleration applied to mobile object 100, a depression amount (accelerator position) of an accelerator pedal, a depression amount of a brake pedal, a steering angle, and a pulse rate, facial expression, and line of sight of the driver which are detected by a driver monitor. The vehicle information also includes data unique to mobile object 100, such as a vehicle width, a vehicle height, a total length, and an eye point.

The position information is information based on a position of mobile object 100, such as road information at an own vehicle position, which can be detected by using a global positioning system (GPS). Specific examples of the position information include a number of traffic lanes of a road at an own vehicle position, information indicating whether a road is an intersection, information indicating whether a road is a T-shaped intersection, information indicating whether a road is a one-way road, a road width, information indicating whether there is a sidewalk, a slope, and a curvature of a curve.

Specific examples of each of the ADAS information, the vehicle information, and the position information are not limited to those described above. For example, if the driver monitor can detect a direction of a face of the driver, a sleepiness level, an emotion, and the like, the vehicle information also includes these pieces of information (the direction of the face of the driver, the sleepiness level, the emotion, and the like).

Coordinate prediction unit 111A predicts relative coordinates of an occurrence place of an event relative to mobile object 100. The "relative coordinates" mean coordinates of an occurrence place of an event associated with driving of mobile object 100 when a position of mobile object 100 is set as an origin point (reference point). As an example of this exemplary embodiment, an X-Y orthogonal coordinate system with a lateral direction of mobile object 100 being an X-axis and a longitudinal direction of mobile object 100 being a Y-axis is applied to relative coordinates of an occurrence place of an event relative to mobile object 100. Assume that a right side viewed from mobile object 100 is a "positive" side of the X-axis, and a front side viewed from mobile object 100 is a "positive" side of the Y-axis. Mobile object 100 has a certain size (area) in a top view. For this reason, in a strict sense, one point on mobile object 100 is set as the origin point. Likewise, because an occurrence place of an event also has a certain size (area) in a planar view, coordinates of one point on the occurrence place of the event are relative coordinates in a strict sense. For example, coordinates of a central point of mobile object 100 in a top view are set to the origin point (0, 0), and coordinates of a central point on an occurrence place of an event are determined as relative coordinates in a top view with reference to the origin point.

That is, when occurrence of an event is predicted during driving of mobile object 100, a relative position of an occurrence place as a place where occurrence of the event is predicted when viewed from mobile object 100 is represented by the relative coordinates. For example, when occurrence of an event is predicted at a place located 1 m left and 5 m ahead from mobile object 100, the relative coordinates of the occurrence place of the event relative to mobile object 100 are (−1, 5).

In this exemplary embodiment, coordinate prediction unit 111A predicts the relative coordinates of the occurrence place of the event relative to mobile object 100 are predicted by using a prediction model and the prediction information associated with mobile object 100. The prediction information is information that represents a situation of mobile object 100 and is identical to the mobile object information acquired by first processor 113. The "prediction model" is a learned model generated in learning block 12 from the history information or the like representing a situation of mobile object 100 upon actual occurrence of an event by using a machine learning algorithm.

Coordinate prediction unit 111A also estimates the occurrence place of the event on the basis of predicted relative coordinates and the mobile object information. That is, coordinate prediction unit 111A predicts relative coordinates of the occurrence place of the event relative to mobile object 100, and estimates the occurrence place of the event predicted to occur on the basis of the relative coordinates and the mobile object information acquired by first processor 113.

For example, coordinate prediction unit 111A estimates an object that is located adjacent to mobile object 100 and at a position indicated by the relative coordinates as the occurrence place of the event. As described above, the "occurrence place of the event" includes both a place where the event occurs, such as an intersection or sidewalk, and a specific object as a target for the event such as a vehicle, pedestrian, or small animal adjacent to mobile object 100. Note that in this exemplary embodiment, the latter (specific object) is an estimation target. A specific process by coordinate prediction unit 111A will be described in a section of "(2.2) Prediction operation".

Coordinate prediction unit 111A also transmits the history information representing the situation of mobile object 100 upon occurrence of the event to learning block 12. The "history information" is information that represents the situation of mobile object 100 and is identical to the mobile object information (and prediction information) acquired by first processor 113. That is, the history information includes at least one of information (ADAS information) concerning an object adjacent to mobile object 100, information (vehicle information) concerning the condition of mobile object 100, and information (position information) concerning the position of mobile object 100. Note that coordinate prediction unit 111A transmits the history information to learning block 12 only at occurrence of the event instead of always transmitting the history information to learning block 12. Occurrence of the event can be detected from detection results obtained by a sonar sensor, a radar, and the like, an operation condition of an air bag, detection results on sudden braking and sudden steering, or a driver's pulse, driver's facial expression, and the like that are measured by a driver monitor. That is, prediction block 11A is triggered by occurrence of the event to transmit, for example, the history information during several seconds before and after an occurrence time of the event to learning block 12. In this case, when the history information is acquired at predetermined time intervals (for example, 0.1 s), a plurality of pieces of history information acquired during several seconds before and after the occurrence time of the event are collectively transmitted to learning block 12.

Note that coordinate prediction unit 111A transmits label information representing the relative coordinates of the occurrence place of the event relative to mobile object 100 together with the history information to learning block 12. The relative coordinates represented by the label information are relative coordinates of the occurrence place of the event actually detected relative to mobile object 100, unlike the relative coordinates predicted by coordinate prediction unit 111A. When the plurality of pieces of history information are collectively transmitted to learning block 12, the label information is associated with each of the plurality of pieces of history information. Although described in detail later, learning block 12 uses the history information and the label information (relative coordinates) to generate a prediction model.

Model storage unit 112A stores the prediction model used for prediction of relative coordinates by coordinate prediction unit 111A. In this exemplary embodiment, learning block 12 generates the prediction model by communication between prediction block 11A and learning block 12. The generated prediction model is transmitted (delivered) from learning block 12 to prediction block 11A and stored (retained) in model storage unit 112A. Assume that in the exemplary embodiment, one prediction model is stored in model storage unit 112A. Model storage unit 112A occasionally acquires a new prediction model from learning block 12 and occasionally updates a stored prediction model. Note that model storage unit 112A may store a plurality of prediction models.

Second processor 114 is connected to coordinate prediction unit 111A and notification unit 13. Second processor 114 as an output information processor receives an event prediction result obtained by coordinate prediction unit 111A. In this exemplary embodiment, second processor 114 receives the occurrence place of the event estimated from the relative coordinates as the event prediction result. Second processor 114 outputs the prediction result on the event (a predicted occurrence place of an event) obtained by coordinate prediction unit 111A to notification unit 13. Notification unit 13 notifies this prediction result. In the exemplary embodiment, notification unit 13 includes a display unit that notifies of the prediction result on the event by displaying the prediction result. Accordingly, second processor 114 outputs the prediction result on the event as data that can be displayed on the display unit to notification unit 13.

Notification unit 13 notifies of a predicted occurrence place of an event estimated from the relative coordinates as the event prediction result. That is, coordinate prediction unit 111A estimates the predicted occurrence place of the event from the relative coordinates, and hence notification unit 13 notifies of (displays) the predicted occurrence place of the event by receiving the event prediction result from second processor 114. Notification unit 13 includes, as examples of display units, three-dimensional head-up display (3D-HUD) 131, two-dimensional head-up display (2D-HUD) 132, meter 133, and multi-information display 134. 3D-HUD 131 and 2D-HUD 132 each project an image onto a windshield of mobile object 100 from below (dashboard) to make the driver visually recognize the image reflected by the windshield. In particular, 3D-HUD 131 can project an image that is visually recognized as having a depth on a road in front of mobile object 100. A specific display form of notification unit 13 will be described in a section of "(2.2) Prediction operation".

Learning block 12 includes accumulation unit 121 and generator 122. Learning block 12 is formed from a computer system including, for example, a CPU and a memory as main components. The CPU executes a program stored in the memory to make the computer system function as learning block 12. The program may be recorded in the memory of learning block 12 in advance, or may be provided via an electric communication line such as the Internet or by being recorded in a recording medium such as a memory card.

Accumulation unit 121 accumulates a plurality of pieces of learning data including the history information representing situations of mobile object 100 at occurrence of events. In this exemplary embodiment, accumulation unit 121 accumulates the label information (relative coordinates) transmitted from coordinate prediction unit 111A to learning block 12 as learning data, together with the history information. That is, each of a plurality of pieces of learning data accumulated in accumulation unit 121 includes the history information at occurrence of an event and the label information representing relative coordinates of an occurrence place of the event relative to mobile object 100.

In this manner, accumulation unit 121 is triggered by occurrence of an event to accumulate, as the learning data, the history information to which the label information representing relative coordinates is added. The learning data is accumulated in accumulation unit 121 at every occurrence of an event, and a plurality of pieces of learning data are accumulated in accumulation unit 121. The plurality of pieces of learning data accumulated in accumulation unit 121 are a learning data set used for generation of the prediction model by generator 122. That is, the plurality of pieces of learning data constitute the learning data set processed in a form suitable for machine learning by generator 122 by letting the history information undergo an annotation process.

Generator 122 generates the prediction model by using the plurality of pieces of learning data. Generator 122 generates the prediction model by using a predetermined amount or more of learning data and the machine learning algorithm. As described above, the prediction model is a learned model to be used by coordinate prediction unit 111A to predict the relative coordinates of the occurrence place of the event relative to mobile object 100. The prediction model generated by generator 122 is transmitted from learning block 12 to prediction block 11A and stored in model storage unit 112A. Generator 122 includes a sample for evaluating the prediction model. Every time evaluation of the prediction model is improved, generator 122 transmits the prediction model to prediction block 11A to update the prediction model stored in model storage unit 112A.

(2) Operation

An operation of event prediction system 1A will be described next.

(2.1) Learning Operation

Figure 2:
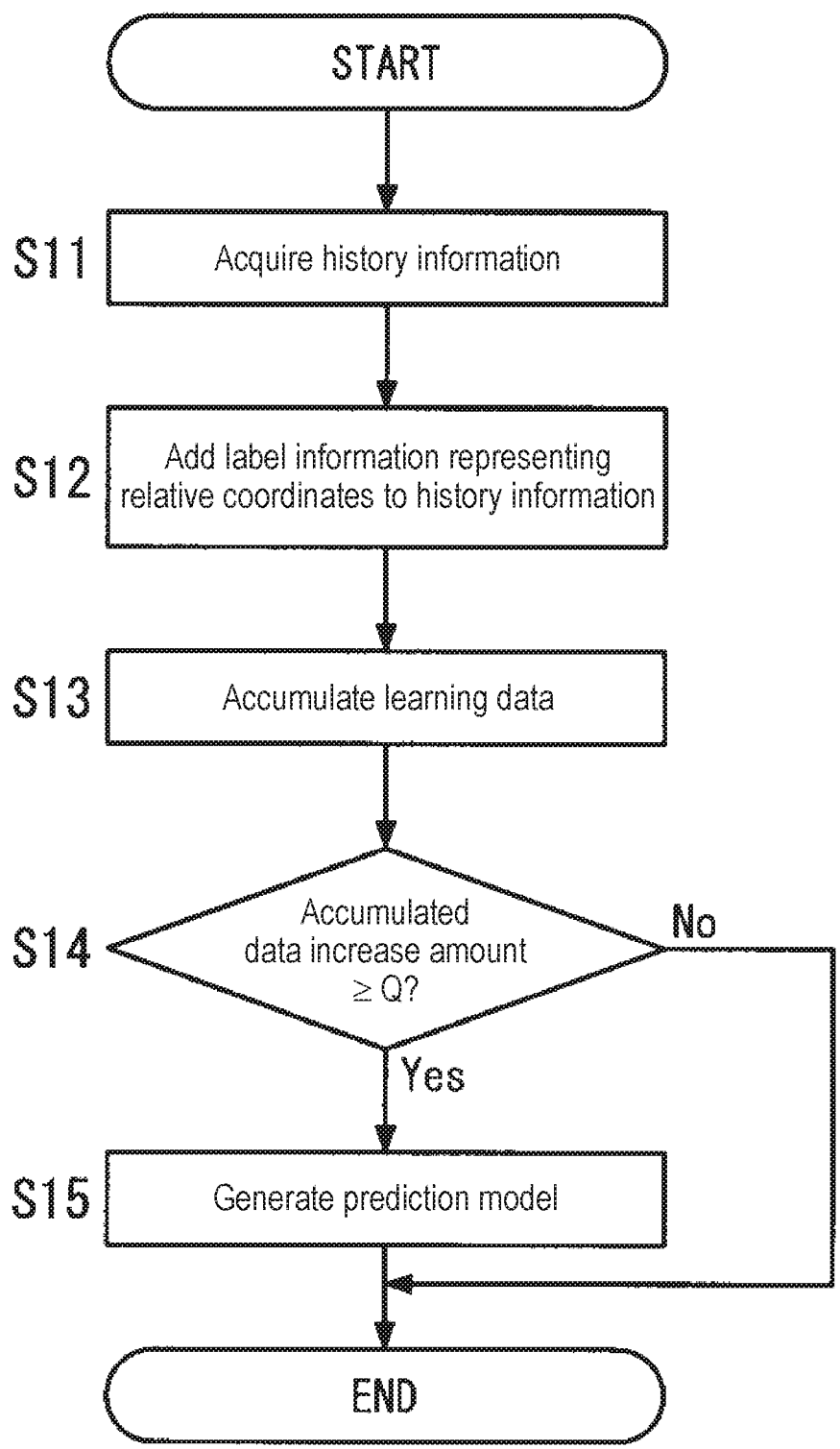
FIG. 2 is a flowchart showing an operation of the event prediction system shown in FIG. 1 concerning generation of a prediction model.

The operation of event prediction system 1A concerning generation of a prediction model in learning block 12 will be described with reference to FIG. 2. FIG. 2 is a flowchart showing an operation of event prediction system 1A concerning generation of the prediction model.

Learning block 12 is triggered by occurrence of an event in prediction block 11A to acquire the history information from prediction block 11A (step S11). In addition, learning block 12 acquires the label information (relative coordinates) associated with the history information, together with the history information. Learning block 12 performs an annotation process of adding the acquired label information to the history information (step S12). Learning block 12 accumulates, as the learning data in accumulation unit 121, the history information obtained in this manner, to which the label information representing the relative coordinates is added (step S13).

Learning block 12 compares predetermined value Q with an accumulated data increase amount that is a value (for example, a bit count) representing an increase amount of accumulated learning data (step S14). If an accumulated data increase amount is more than or equal to predetermined value Q (Yes in step S14), learning block 12 generates the prediction model by using generator 122 (step S15). Generator 122 generates the prediction model by using a plurality of pieces of learning data accumulated in accumulation unit 121 and a machine learning algorithm. The prediction model generated by generator 122 is transmitted from learning block 12 to prediction block 11A and stored in model storage unit 112A. In contrast to this, if the accumulated data increase amount is less than predetermined value Q (No in step S14), event prediction system 1A skips step S15 and terminates a series of processes in learning block 12.

Event prediction system 1A generates the prediction model by causing prediction block 11A to repeatedly perform processes in steps S11 to S15 every time an event occurs. Every time evaluation of a prediction model is improved, learning block 12 transmits the prediction model to prediction block 11A, and updates the prediction model stored in model storage unit 112A.

Learning block 12 may accumulate a plurality of pieces of learning data in accumulation unit 121 in advance when starting an operation of event prediction system 1A. This configuration allows generator 122 to generate the prediction model without acquiring the history information from prediction block 11A. The above applies to prediction models. At the start of an operation of event prediction system 1A, default prediction models may be stored in learning block 12 and model storage unit 112A.

(2.2) Prediction Operation

Figure 3:
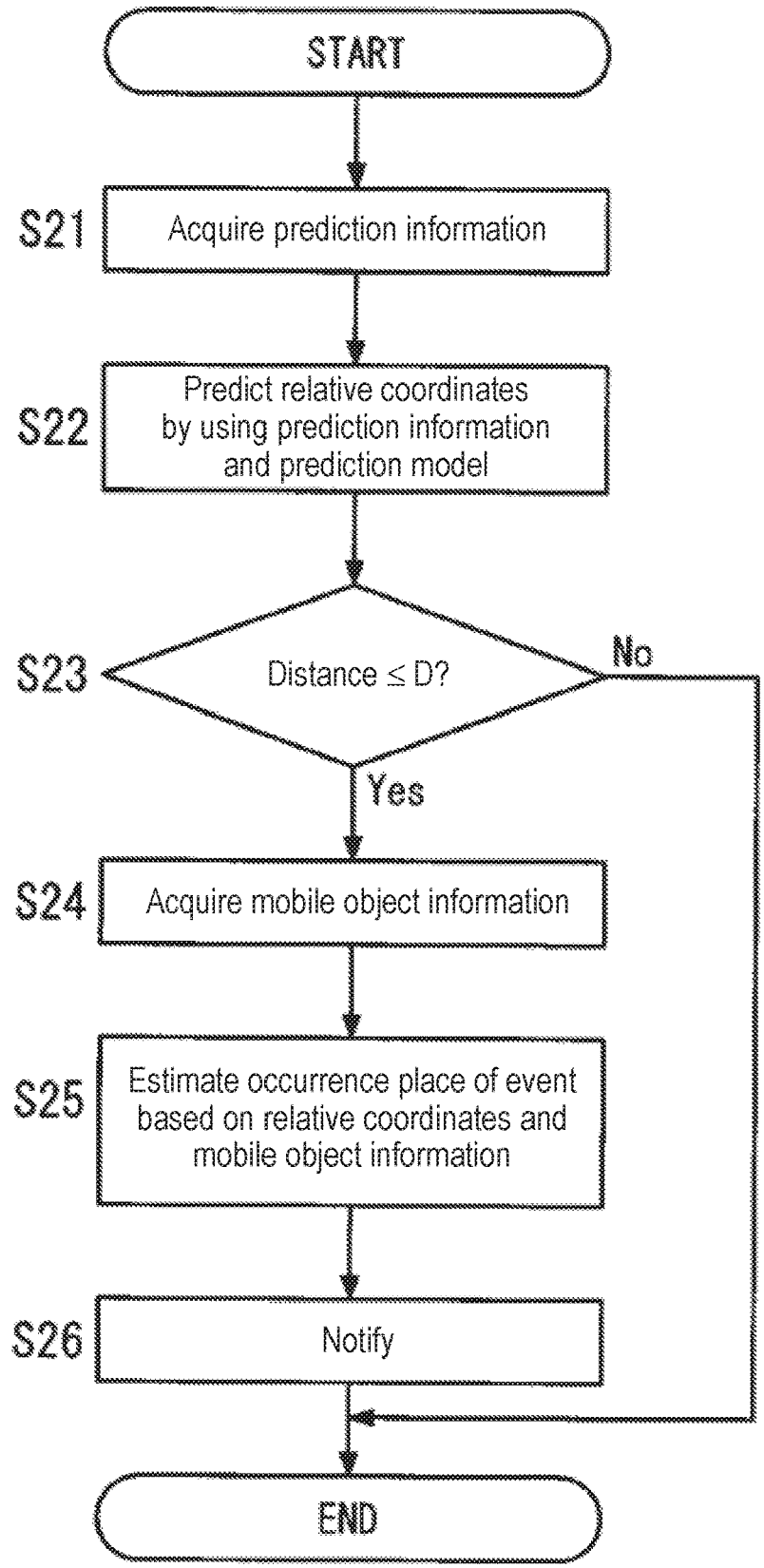
FIG. 3 is a flowchart showing an operation of the event prediction system shown in FIG. 1 concerning estimation of an occurrence place of an event.

An operation of event prediction system 1A associated with estimation of an occurrence place of an event in prediction block 11A will be described next with reference to FIG. 3. FIG. 3 is a flowchart showing an operation of event prediction system 1A concerning estimation of an occurrence place of an event.

In prediction block 11A, coordinate prediction unit 111A acquires the prediction information (step S21). At this time, coordinate prediction unit 111A receives, as the prediction information, the ADAS information, the vehicle information, and the position information input from first input unit 14, second input unit 15, and third input unit 16, respectively, to first processor 113. In prediction block 11A, coordinate prediction unit 111A predicts relative coordinates of an occurrence place of an event relative to mobile object 100 by using the acquired prediction information and the prediction model stored in model storage unit 112A (step S22). If a situation of mobile object 100 which is specified from the prediction information indicates that, for example, an event is likely to occur at a place located 1 m left and 5 m ahead from mobile object 100, the relative coordinates of the occurrence place of the event relative to mobile object 100 are predicted to be (−1, 5). Acquisition of the prediction information (step S21) and prediction of the relative coordinates (step S22) are occasionally executed at predetermined time intervals. Steps S21 and S22 are occasionally executed at, for example, 0.1-s intervals.

Prediction block 11A calculates a distance from mobile object 100 to a position indicated by the predicted relative coordinates, and compares the calculated distance with specified distance D (step S23). Assume that specified distance D is, for example, 70 m. If the distance from mobile object 100 to the position indicated by the relative coordinates is less than or equal to specified distance D (Yes in step S23), prediction block 11A starts a process for estimating the occurrence place of the event. More specifically, prediction block 11A causes coordinate prediction unit 111A to acquire the mobile object information representing the situation of mobile object 100 (step S24). At this time, coordinate prediction unit 111A acquires the ADAS information, the vehicle information, and the position information as the prediction information input from first input unit 14, second input unit 15, and third input unit 16, respectively, to first processor 113.

Subsequently, in prediction block 11A, coordinate prediction unit 111A executes an estimation process of estimating the occurrence place of the event based on the relative coordinates and the mobile object information (step S25). At this time, on the basis of the relative coordinates and the mobile object information, coordinate prediction unit 111A estimates an object existing at a position indicated by the relative coordinate adjacent to mobile object 100 as the occurrence place of the event. More specifically, coordinate prediction unit 111A estimates the occurrence place of the event by using the predicted relative coordinates and information such as the ADAS information and the position information included in the mobile object information.

Figure 4:
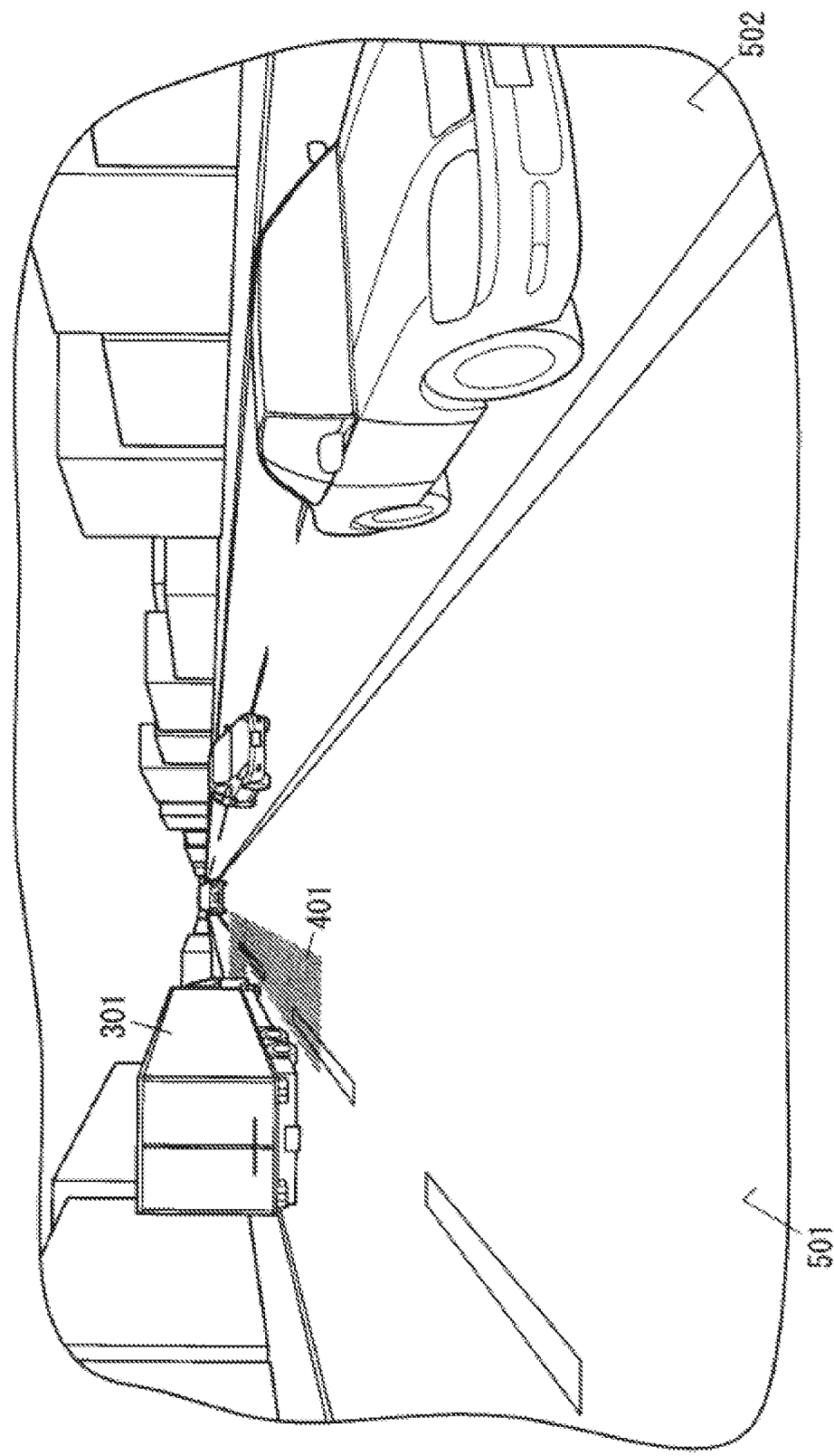
FIG. 4 is a conceptual view showing a visual field of a driver when the event prediction system shown in FIG. 1 is used.

The following is a description of the estimation process for the occurrence place of the event by coordinate prediction unit 111A in a situation shown in FIG. 4, as an example. FIG. 4 is a conceptual view showing a visual field of a driver of mobile object 100. In this example, driving lane 501 on which an own vehicle (mobile object 100) is traveling and opposite lane 502 each are assumed to be a two-lane straight road. Truck 301 is parked on a road shoulder of driving lane 501 ahead of mobile object 100 on the left. Assume that a distance from mobile object 100 to truck 301 is 66 m.

In this case, assume that relative coordinates of truck 301 are (−3, 66). Accordingly, coordinate prediction unit 111A can specify existence of parked truck 301 at a position located 3 m left and 66 m ahead from mobile object 100 from information such as an inter-vehicle distance and a relative velocity included in the ADAS information. In this case, coordinate prediction unit 111A determines that an event target is truck 301, and estimates truck 301 as the occurrence place of the event. In this manner, coordinate prediction unit 111A estimates an object (truck 301) that exists adjacent to mobile object 100 and at a position indicated by the relative coordinates as the occurrence place of the event.

Upon completion of the estimation process (step S25) by coordinate prediction unit 111A, notification unit 13 notifies of the occurrence place of the event estimated by coordinate prediction unit 111A (step S26). In the example shown in FIG. 4, for example, 3D-HUD 131 shown in FIG. 1 displays marker 401 adjacent to truck 301 estimated as the occurrence place of the event. Marker 401 is a region indicated by dot-hatching. This allows the driver to see stereoscopic marker 401 superimposed adjacent to truck 301, and hence makes the driver pay attention to truck 301. That is, in a field of view of the driver, augmented reality (AR) display is implemented, which is combined with marker 401 displayed in a real space by 3D-HUD 131.

This allows the driver to check that there is an "invisible danger" such as rushing out of a pedestrian or bicycle from a spot behind truck 301 as a blind spot of the driver. In this manner, event prediction system 1A can assist driving of mobile object 100 by the driver so as to implement safer driving.

On the other hand, if the distance from mobile object 100 to the position indicated by predicted relative coordinates is larger than specified distance D (No in step S23), event prediction system 1A skips steps S24 to S26 and terminates a series of processes in the prediction block 11A.

Event prediction system 1A estimates the occurrence place of the event by repeatedly performing processes in steps S21 to S26 at predetermined time intervals (for example, 0.1 s). Every time the distance from mobile object 100 to the position indicated by relative coordinates is less than or equal to specified distance D (Yes in step S23), event prediction system 1A estimates the occurrence place of the event and notifies of the occurrence place.

The operation of event prediction system 1A associated with estimation of the occurrence place of the event in prediction block 11A is not limited to the example shown in FIG. 3. For example, when information completely identical to the prediction information is used as the mobile object information, acquisition of the mobile object information (step S24) may be omitted.

Second Exemplary Embodiment

Event prediction system 1B according to this exemplary embodiment differs from event prediction system 1A according to the first exemplary embodiment in that coordinate prediction unit 111A uses a different prediction model for attributes of each driver who drives mobile object 100. Other points are the same as event prediction system 1A, and event prediction system 1B has the same basic configuration as that shown in FIG. 1.

That is, in the first exemplary embodiment, coordinate prediction unit 111A predicts the relative coordinates by using a universally applicable prediction model. In contrast to this, coordinate prediction unit 111A according to the second exemplary embodiment predicts the relative coordinates by using different prediction models for different attributes of drivers. The "attributes of drivers" in this case include ages, sexes, and driving habits (for example, the manners of accelerating and braking) of drivers.

In this exemplary embodiment, learning block 12 acquires the history information as the learning data from a plurality of drivers. Generator 122 generates prediction models for the respective attributes of the drivers. For example, generator 122 generates the prediction models for the respective attributes of the drivers by machine learning using a collaborative filtering algorithm used in a recommended algorithm or the like.

A prediction model to be applied is selected for each mobile object 100 from a plurality of types of prediction models generated in this manner. That is, a prediction model to be stored in model storage unit 112A is selected for each mobile object 100. Prediction block 11A determines a prediction model to be acquired in accordance with attributes of a driver of mobile object 100. This allows coordinate prediction unit 111A to predict the relative coordinates by using a different prediction model for the attributes of each driver.

Event prediction system 1B improves prediction accuracy of the relative coordinates by coordinate prediction unit 111A as compared with a case using a universally applicable prediction model.

Event prediction system 1B may selectively use a plurality of prediction models for one mobile object 100. For example, when a family shares one mobile object 100 or car sharing is adopted, a plurality of drivers drive one mobile object 100. In such a case, it is possible to apply a different prediction model to one mobile object 100 for each driver. More specifically, every time a different driver drives mobile object 100, prediction block 11A acquires a prediction model corresponding to the attributes of the driver from learning block 12. Alternatively, a plurality of prediction models may be stored in model storage unit 112A, and coordinate prediction unit 111A may select a prediction model to be used in accordance with the attributes of the driver from the plurality of prediction models.

A configuration of event prediction system 1B can be combined with a configuration of the first exemplary embodiment as needed.

Third Exemplary Embodiment (1) Configuration

Figure 5:
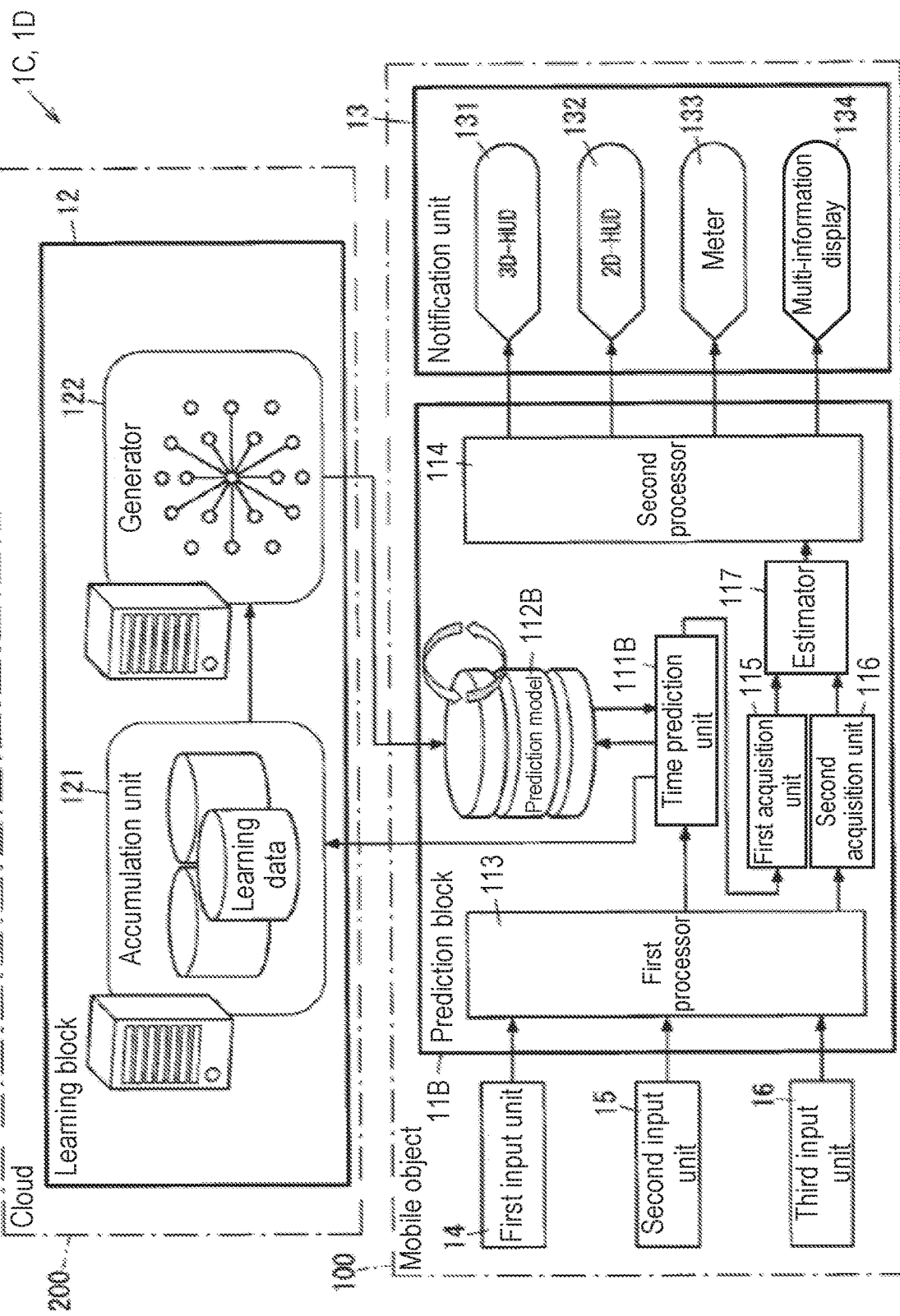
FIG. 5 is a block diagram showing a configuration of an event prediction system according to a third exemplary embodiment of the present disclosure.

FIG. 5 is a block diagram showing a configuration of event prediction system 1C according to a third exemplary embodiment of the present disclosure. Event prediction system 1C includes prediction block 11B implemented in mobile object 100 and learning block 12 implemented in cloud 200.

Event prediction system 1C may further include notification unit 13 mounted in mobile object 100 like event prediction system 1A. Event prediction system 1C further includes first input unit 14, second input unit 15, and third input unit 16 mounted in mobile object 100.

Prediction block 11B and learning block 12 are configured to be communicative with each other. Prediction block 11B is implemented in mobile object 100, and hence communicates with learning block 12 implemented in cloud 200 via, for example, a mobile telephone network (carrier network) provided by a telecommunications carrier or a public circuit network such as the Internet. The third exemplary embodiment is the same as the first exemplary embodiment in this regard.

Prediction block 11B includes first acquisition unit 115, second acquisition unit 116, estimator unit 117, time prediction unit 111B, model storage unit 112B, first processor 113, and second processor 114. Prediction block 11B is formed from a computer system including, for example, a CPU and a memory as main components like prediction block 11A. The CPU executes a program stored in the memory to make the computer system function as prediction block 11B. The program is recorded in the memory of prediction block 11B in advance, but may be provided via an electric communication line such as the Internet or by being recorded in a recording medium such as a memory card.

First acquisition unit 115 acquires time information. The "time information" is information representing a required time until a prediction time point when occurrence of an event associated with driving of mobile object 100 is predicted. That is, when occurrence of an event such as an accident during driving of mobile object 100 is predicted, the time information represents a required time until a prediction time point assuming that the "prediction time" is a time point when occurrence of the event is predicted. For example, when it is predicted that an event will occur 3 s after a current time, that is, when the prediction time point is 3 s after the current time, a required time until the prediction time point is "3 s", and hence the time information is "3 s.

Second acquisition unit 116 acquires mobile object information. The "mobile object information" is information representing a situation of mobile object 100. In this exemplary embodiment, the mobile object information includes at least one of information (also called "ADAS" information") concerning an object adjacent to mobile object 100, information (also called "vehicle information") concerning a condition of mobile object 100, and information (also called "position information") concerning a position of mobile object 100.

The ADAS information, the vehicle information, and the position information are the same as the respective pieces of information included in the prediction information or the history information in the first exemplary embodiment, and hence a description of each pieces of information will be omitted.

Estimator 117 estimates an occurrence place of an event on the basis of the time information and the mobile object information. That is, estimator 117 estimates the occurrence place of the event predicted to occur on the basis of the time information acquired by first acquisition unit 115 and the mobile object information acquired by second acquisition unit 116.

More specifically, estimator 117 predicts an arrival position of mobile object 100 at a prediction time point based on the time information and the mobile object information, and estimates the occurrence place of the event from the predicted arrival position. That is, estimator 117 predicts first the arrival position of mobile object 100 at the time point (prediction time point) when occurrence of the event is predicted from the time information. Estimator 117 then estimates the occurrence place of the event from the arrival position.

Estimator 117 may further estimate an object existing adjacent to mobile object 100 at an arrival position after a required time as the occurrence place of the event. The "occurrence place of the event" includes both a place where an event occurs, such as an intersection or pedestrian crosswalk, and a specific object as an event target such as a vehicle, pedestrian, or small animal adjacent to mobile object 100. Of these elements, the specific object is assumed to be an estimation target in this exemplary embodiment. A specific process by estimator 117 will be described in a section of "(2.2) Prediction operation".

Time prediction unit 111B predicts a required time. In this exemplary embodiment, time prediction unit 111B predicts the required time until the prediction time point when an event will occur by using the prediction information concerning mobile object 100 and a prediction model. The prediction information is information that represents a situation of mobile object 100 and is identical to the mobile object information acquired by second acquisition unit 116. The "prediction model" is a learned model generated in learning block 12 from the history information or the like representing the situation of mobile object 100 upon actual occurrence of an event by using a machine learning algorithm. That is, time prediction unit 111B generates the time information representing the required time until the prediction time point, which is acquired by first acquisition unit 115, by using the prediction model instead of acquiring the time information by time prediction unit 111B from outside.

In addition, time prediction unit 111B transmits the history information representing the situation of mobile object 100 at occurrence of the event to learning block 12. The "history information" represents the situation of mobile object 100 and is identical to the mobile object information (and the prediction information) acquired by second acquisition unit 116. Note that time prediction unit 111B transmits the history information to learning block 12 only at occurrence of the event instead of always transmitting the history information to learning block 12. Occurrence of the event can be detected from detection results obtained by a sonar sensor, a radar, and the like, an operation condition of an air bag, and detection results on sudden braking and sudden steering, or a pulse, facial expression, and the like of the driver measured by a driver monitor. That is, prediction block 11B is triggered by occurrence of the event to transmit, for example, the history information during several seconds before and after the occurrence of the event to learning block 12. In this case, when the history information is acquired at predetermined time intervals (for example, 0.1 s), a plurality of pieces of history information acquired during several seconds before and after the occurrence time of the event are collectively transmitted to learning block 12.

Note that time prediction unit 111B transmits the time information representing the required time until the occurrence time point of the event as label information, together with the history information, to learning block 12. The time information represented by the label information represents an actual required time until a time point when occurrence of the event is detected, unlike the time information predicted by time prediction unit 111B. When a plurality of pieces of history information are collected in a learning block and transmitted, pieces of time information as the label information are respectively associated with the plurality of pieces of history information. In addition, the time information representing the label information preferably also represents an elapsed time since the occurrence time point of the event in addition to the required time until the occurrence time point of the event. The required time until the occurrence time point of the event is discriminated from the elapsed time since the occurrence time point of the event by, for example, a sign (+/−). For example, if the required time and the elapsed time are respectively represented by "+" and "−", 5 s before the occurrence time point of the event is represented by "+5 s", and 5 s after the occurrence time point of the event is represented by "−5 s". Although described in detail later, the history information and the label information (time information) are used by learning block 12 to generate a prediction model.

Model storage unit 112B stores the prediction model used by time prediction unit 111B to predict the required time. In this exemplary embodiment, learning block 12 generates the prediction model by communication between prediction block 11B and learning block 12. The generated prediction model is transmitted (delivered) from learning block 12 to prediction block 11B and stored (retained) in model storage unit 112B. In this exemplary embodiment, assume that one prediction model is stored in model storage unit 112B. Model storage unit 112B occasionally acquires a new prediction model from learning block 12 and occasionally updates a stored prediction model. Note, however, that model storage unit 112B may store a plurality of prediction models.

As in the first exemplary embodiment, first processor 113 receives the ADAS information from first input unit 14, the vehicle information from second input unit 15, and the position information from third input unit 16. First processor 113 outputs the ADAS information, the vehicle information, and the position information as the mobile object information to second acquisition unit 116. In addition, first processor 113 outputs the ADAS information, the vehicle information, and the position information as the prediction information to time prediction unit 111B. That is, in this exemplary embodiment, the mobile object information and the prediction information each include all of the ADAS information, the vehicle information, and the position information.

Second processor 114 is connected to estimator 117 and notification unit 13. Second processor 114 receives an estimation result obtained by estimator 117, that is, an occurrence place of an event estimated by estimator 117. Second processor 114 outputs the occurrence place of the event estimated by estimator 117 to notification unit 13. Notification unit 13 notifies of this estimation result. At this time, second processor 114 outputs the estimation result obtained by estimator 117 as data that can be displayed on the display unit to notification unit 13.

Notification unit 13 notifies of the occurrence place of the event estimated by estimator 117. That is, notification unit 13 receives the estimation result obtained by estimator 117 from second processor 114 to notify of (display in this exemplary embodiment) the occurrence place of the event. Details of notification unit 13 are the same as those in the first exemplary embodiment, and hence a description of the details will be omitted. A specific display form of notification unit 13 will be described in a section of "(2.2) Prediction operation".

Learning block 12 includes accumulation unit 121 and generator 122. A detailed configuration of learning block 12 is the same as that of the first exemplary embodiment, and hence a description of the configuration will be omitted.

Accumulation unit 121 accumulates a plurality of pieces of learning data including the history information representing situations of mobile object 100 at occurrence of events. In this exemplary embodiment, accumulation unit 121 accumulates the label information (time information) transmitted from time prediction unit 111B to learning block 12, together with the history information, as the learning data. That is, each of a plurality of pieces of learning data accumulated in accumulation unit 121 includes the history information at occurrence of an event and the time information representing the required time until an occurrence time point of the event (or an elapsed time since the occurrence time point of the event).

Accumulation unit 121 is triggered by occurrence of the event to accumulate, as the learning data, the history information to which the time information (label information) is added. The learning data is accumulated in accumulation unit 121 at every occurrence of an event, and a plurality of pieces of learning data are accumulated in accumulation unit 121. The plurality of pieces of learning data accumulated in accumulation unit 121 are a learning data set used for generation of the prediction model by generator 122. That is, the plurality of pieces of learning data constitute the learning data set processed in a form suitable for machine learning by generator 122 by letting the history information undergo an annotation process.

Generator 122 generates the prediction model by using the plurality of pieces of learning data. Generator 122 generates the prediction model by using a predetermined amount or more of learning data and the machine learning algorithm. As described above, the prediction model is a learned model used by time prediction unit 111B to predict the required time until a prediction time point when occurrence of an event is predicted. The prediction model generated by generator 122 is transmitted from learning block 12 to prediction block 11B and stored in model storage unit 112B. Generator 122 has a sample for evaluation of the prediction model, and transmits the prediction model to prediction block 11B every time evaluation of the prediction model is improved, thus updating the prediction model stored in model storage unit 112B.

(2) Operation

An operation of event prediction system 1C according to this exemplary embodiment will be described next.

(2.1) Learning Operation

Figure 6:
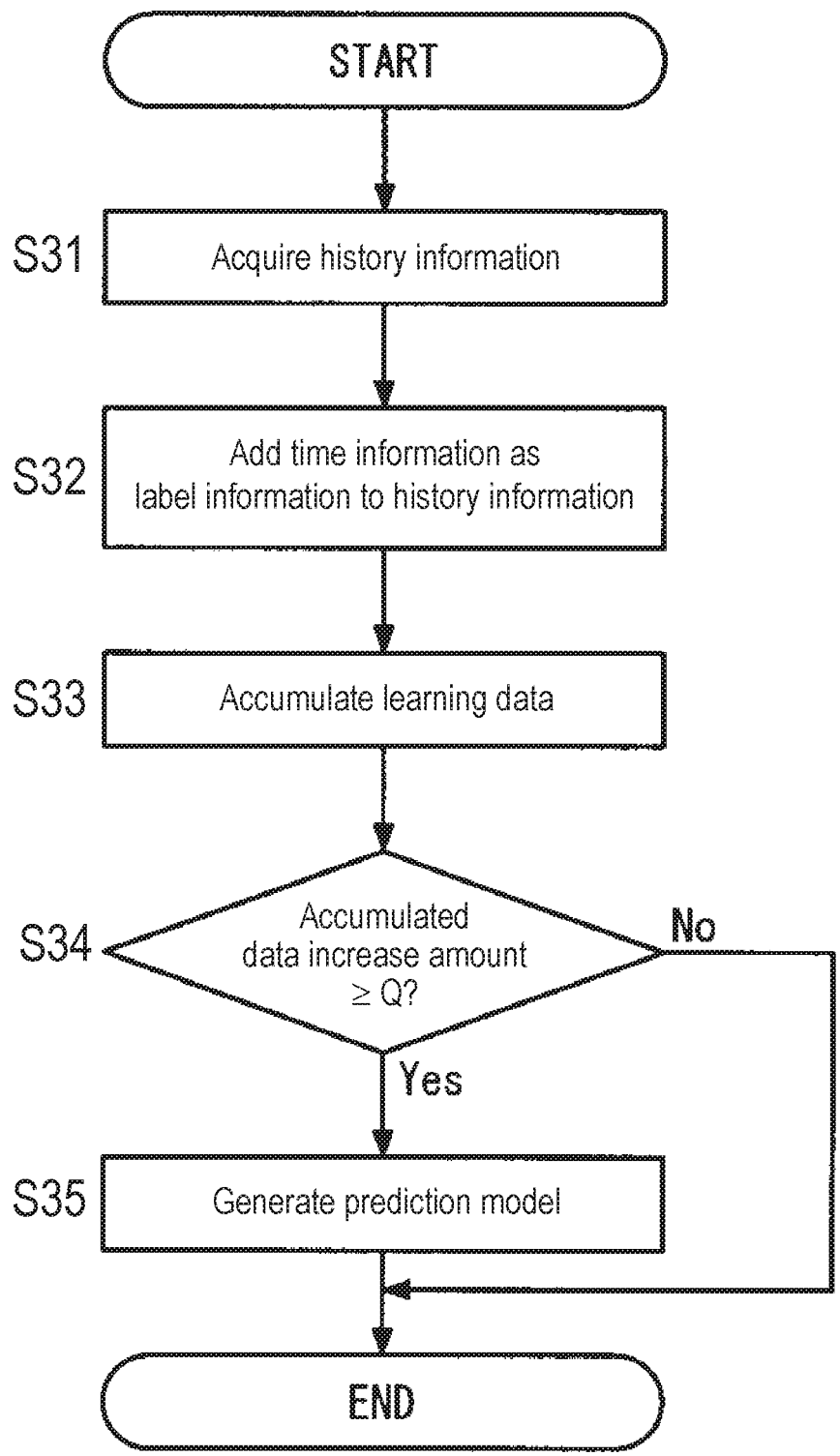
FIG. 6 is a flowchart showing an operation of the event prediction system shown in FIG. 5 concerning generation of a prediction model.

The operation of event prediction system 1C concerning generation of the prediction model in learning block 12 will be described first with reference to FIG. 6. FIG. 6 is a flowchart showing an operation of event prediction system 1C concerning generation of the prediction model.

Learning block 12 is triggered by occurrence of an event in prediction block 11B to acquire the history information from prediction block 11B (step S31). Learning block 12 also acquires the label information (time information) associated with the history information, together with the history information. Learning block 12 performs an annotation process of adding the acquired time information as the label information to the history information (step S32). Learning block 12 accumulates the history information, which is obtained in this manner and to which the label information (time information) is added as the learning data in accumulation unit 121 (step S33).

Learning block 12 compares predetermined value Q with a value (for example, a bit count) representing an increase amount in accumulated learning data as an accumulated data increase amount (step S34). If the accumulated data increase amount is more than or equal to predetermined value Q (Yes in step S34), generator 122 generates the prediction model by using a plurality of pieces of learning data accumulated in accumulation unit 121 and a machine learning algorithm (step S35). The prediction model generated by generator 122 is transmitted from learning block 12 to prediction block 11B and stored in model storage unit 112B. In contrast to this, if the accumulated data increase amount is less than predetermined value Q (No in step S34), event prediction system 1C skips step S35 and terminates a series of processes in learning block 12.

Event prediction system 1C generates the prediction model by causing prediction block 11B to repeatedly perform processes in steps S31 to S35 every time an event occurs. Every time evaluation of the prediction model is improved, learning block 12 transmits the prediction model to prediction block 11B, and updates a prediction model stored in model storage unit 112B.

Learning block 12 may accumulate a plurality of pieces of learning data in accumulation unit 121 in advance when starting the operation of event prediction system 1C. This configuration allows generator 122 to generate the prediction model without acquiring the history information from prediction block 11B. The above applies to prediction models. At the start of the operation of event prediction system 1C, default prediction models may be stored in learning block 12 and model storage unit 112B.

The time information as the label information preferably represents an elapsed time since the occurrence time point of the event in addition to the required time until the occurrence time point of the event. That is, learning block 12 preferably accumulates not only the history information before occurrence of the event but also the history information after occurrence of the event, upon addition of the label information (time information) representing the elapsed time since the occurrence time point of the event, as the learning data in accumulation unit 121. Using the history information after occurrence of the event will improve specification accuracy of an occurrence time point of the event. This will improve evaluation of the prediction model generated by generator 122. In addition, using the history information after occurrence of the event allows learning block 12 to verify true or false about occurrence of an event. Assume that after occurrence of an event is detected from a detection result on sudden braking, it is determined from a situation or the like of mobile object 100 that no event has occurred. In this case, corresponding learning data can be discarded by regarding that no event has occurred. Assume that after occurrence of the event is detected from the detection result on sudden braking by a driver who roughly drives, it is determined that mobile object 100 keeps moving (traveling) normally. In this case, learning block 12 discards corresponding learning data. This improves quality of the learning data accumulated in accumulation unit 121.

(2.2) Prediction Operation

Figure 7:
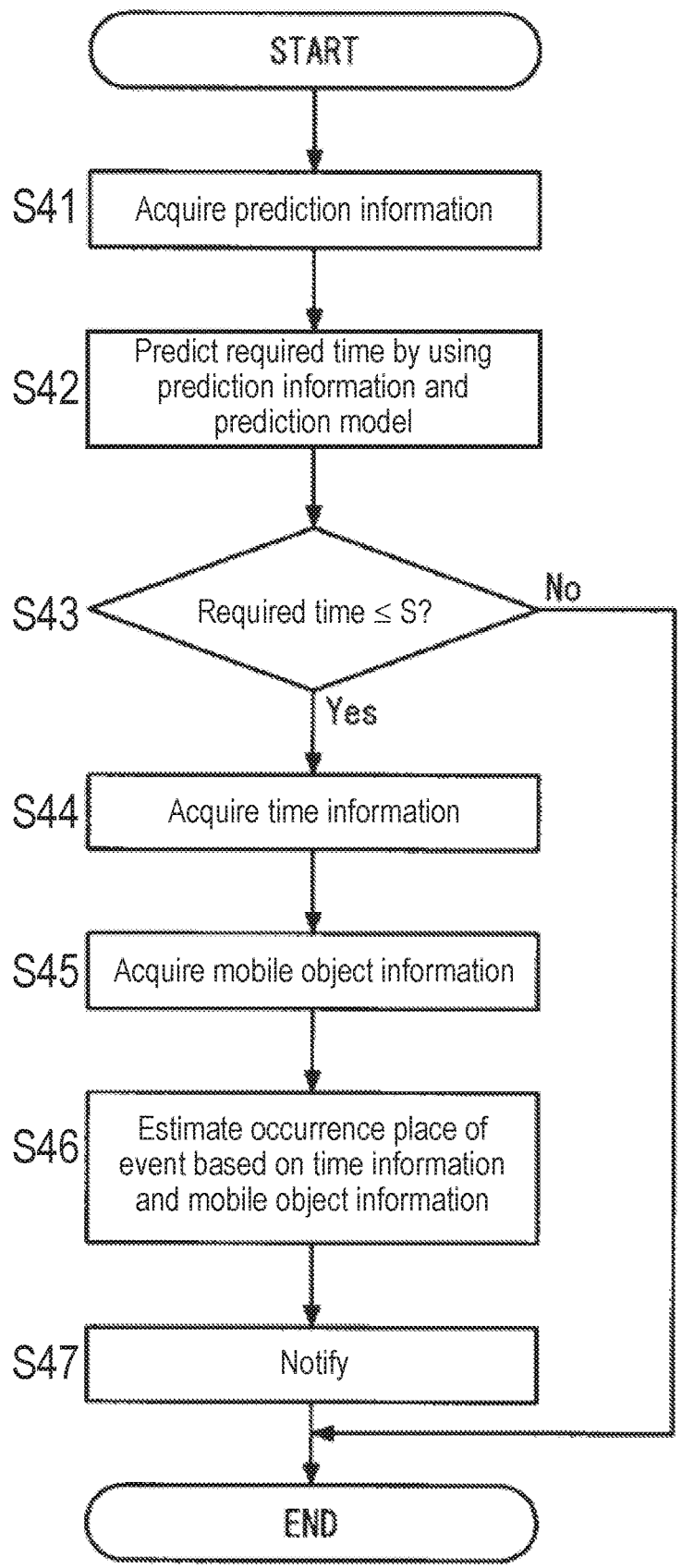
FIG. 7 is a flowchart showing an operation of the event prediction system shown in FIG. 5 concerning estimation of an occurrence place of an event.

The operation of event prediction system 1C concerning estimation of an occurrence place of an event in prediction block 11B will be described next with reference to FIG. 7. FIG. 7 is a flowchart showing the operation of event prediction system 1C concerning estimation of the occurrence place of the event.

In prediction block 11B, time prediction unit 111B acquires prediction information (step S41). At this time, time prediction unit 111B receives, as the prediction information, the ADAS information, the vehicle information, and the position information input from first input unit 14, second input unit 15, and third input unit 16 to first processor 113, respectively. In prediction block 11B, time prediction unit 111B predicts the required time by using the acquired prediction information and a prediction model stored in model storage unit 112B (step S42). In this case, if a situation of mobile object 100 which is specified by prediction information is a situation in which it is determined that an event is likely to occur after 3 s, the required time is predicted to be 3 s. Acquisition of the prediction information (step S41) and prediction of the required time (step S42) are occasionally executed at predetermined time intervals (for example, 0.1 s).

Prediction block 11B compares the predicted required time with specified time S (for example, 5 s) (step S43). If the required time is less than or equal to specified time S (Yes in step S43), prediction block 11B starts a process for estimating an occurrence place of an event. More specifically, first acquisition unit 115 executes a first acquisition process (step S44) of acquiring time information representing the required time until a prediction time point when an event is predicted to occur. At this time, first acquisition unit 115 acquires information concerning the required time predicted by time prediction unit 111B as the time information from time prediction unit 111B. In addition, prediction block 11B executes a second acquisition process (step S45) of causing second acquisition unit 116 to acquire the mobile object information representing the situation of mobile object 100. At this time, second acquisition unit 116 acquires, as the prediction information, the ADAS information, the vehicle information, and the position information input from first input unit 14, second input unit 15, and third input unit 16 to first processor 113, respectively.

Subsequently, prediction block 11B causes estimator 117 to execute an estimation process (step S46) of estimating an occurrence place of an event on the basis of the time information and the mobile object information. More specifically, estimator 117 first predicts an arrival position of mobile object 100 at a prediction time point on the basis of the time information and the mobile object information. Letting T [s] be a required time until a prediction time point when an event is predicted to occur and V [m/s] be a moving velocity (traveling velocity) of mobile object 100, distance D [m] to an arrival position is obtained by "D=V×T". Required time T is specified by the time information, and the moving velocity of mobile object 100 is specified by the vehicle information included in the mobile object information.

Estimator 117 estimates, as an occurrence place of an event, an object that exists adjacent to mobile object 100 and will exist at an arrival position after a required time. More specifically, estimator 117 estimates an occurrence place of an event by using information such as distance D to the calculated arrival position, the ADAS information included in the mobile object information, and the position information.

The following is an example in which estimator 117 performs an estimation process for an occurrence place of an event in a situation like that shown in FIG. 4. The assumptions in FIG. 4 are the same as those described in the first exemplary embodiment.

In this case, if required time T is 4 s and moving velocity V is 16.67 m/s, distance D to an arrival position is 66.68 m. Accordingly, estimator 117 can specify, from information such as an inter-vehicle distance and a relative velocity included in the ADAS information, that parked truck 301 exists at the arrival position (66.68 m ahead) of mobile object 100 at a prediction time point. In this case, estimator 117 determines that the event target is truck 301, and estimates that truck 301 is an occurrence place of the event. As described above, estimator 117 estimates an object (truck 301) that exists adjacent to mobile object 100 and will exist at the arrival position after the required time as the occurrence place of the event.

When estimator 117 completes the estimation process (step S46), notification unit 13 notifies of the occurrence place of the event estimated by estimator 117 (step S47). As in the first exemplary embodiment, in the example in FIG. 4, 3D-HUD 131 shown in, for example, FIG. 1 displays marker 401 adjacent to truck 301 estimated as the occurrence place of the event.

In this manner, event prediction system 1C also allows a driver to recognize that an "invisible danger" is lurking, and can assist the driver to drive mobile object 100 more safely.

On the other hand, if the predicted required time is larger than specified time S (No in step S43), event prediction system 1C skips steps S44 to S47 and terminates a series of processes in prediction block 11B.

Event prediction system 1C estimates an occurrence place of an event by repeatedly performing processes in steps S41 to S47 at predetermined time intervals (for example, 0.1 s). Every time the required time becomes less than or equal to specified time S (Yes in step S43), event prediction system 1C estimates and notifies of an occurrence place of an event.

The operation of event prediction system 1C concerning estimation of the occurrence place of the event in prediction block 11B is not limited to the example shown in FIG. 7. For example, an execution order of a first acquisition process (step S44) and a second acquisition process (step S45) may be reversed.

Fourth Exemplary Embodiment

Event prediction system 1D according to this exemplary embodiment differs from event prediction system 1C according to the third exemplary embodiment in that time prediction unit 111B uses a different prediction model for attributes of each driver who drives mobile object 100. In other respects, event prediction system 1D is the same as event prediction system 1C, and a basic configuration of event prediction system 1D is the same as that shown in FIG. 5.

That is, in the third exemplary embodiment, time prediction unit 111B predicts the required time by using the universally applicable prediction model. In contrast to this, in the fourth exemplary embodiment, time prediction unit 111B predicts a required time by using a different prediction model for attributes of each driver. The "attributes of drivers" in this case include ages, sexes, and driving habits (for example, the manners of accelerating and braking) of drivers.

In this exemplary embodiment, learning block 12 acquires history information as learning data from a plurality of drivers. That is, learning block 12 performs the same operation as in the second exemplary embodiment.

The prediction model to be applied is selected for each mobile object 100 from a plurality of types of prediction models generated in this manner. That is, a prediction model stored in model storage unit 112B is selected for each mobile object 100. Prediction block 11B determines a prediction model to be acquired in accordance with attributes of a driver of mobile object 100. This allows time prediction unit 111B to predict a required time by using a different prediction model for attributes of each driver.

Event prediction system 1D improves prediction accuracy of a required time in time prediction unit 111B as compared with a case using a universally applicable prediction model.

In addition, event prediction system 1D may selectively use the plurality of prediction models for one mobile object 100. That is, learning block 12 performs the same operation as in the second exemplary embodiment. More specifically, every time a different driver drives mobile object 100, prediction block 11B acquires the prediction model corresponding to attributes of the driver from learning block 12. Alternatively, a plurality of prediction models may be stored in model storage unit 112B, and time prediction unit 111B may select the prediction model to be used in accordance with attributes of the driver from the plurality of prediction models.

A configuration of event prediction system 1D can be combined with a configuration of the third exemplary embodiment as appropriate.

(Supplementary Note)

Several examples of invisible events (invisible dangers) that can be predicted by event prediction systems 1A to 1D will be described below. In this case, assume that event prediction systems 1A to 1D each display an occurrence place of an event, including an own vehicle (mobile object 100), in a bird's view image.

Figure 8C:
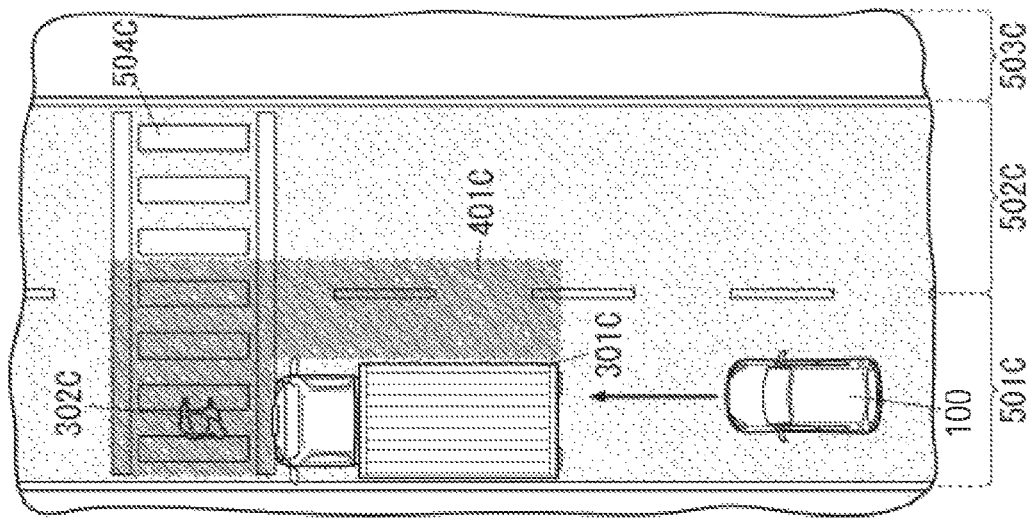
FIG. 8C is a conceptual view showing still another example of the event that can be predicted by the event prediction system shown in FIG. 1.
Figure 8B:
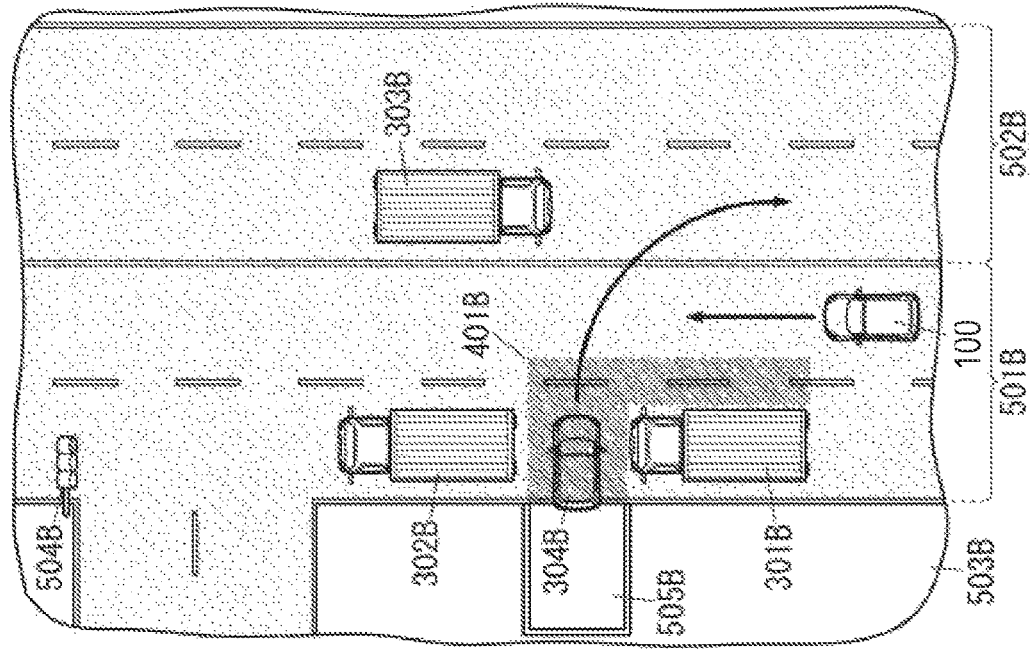
FIG. 8B is a conceptual view showing another example of the event that can be predicted by the event prediction system shown in FIG. 1.
Figure 8A:
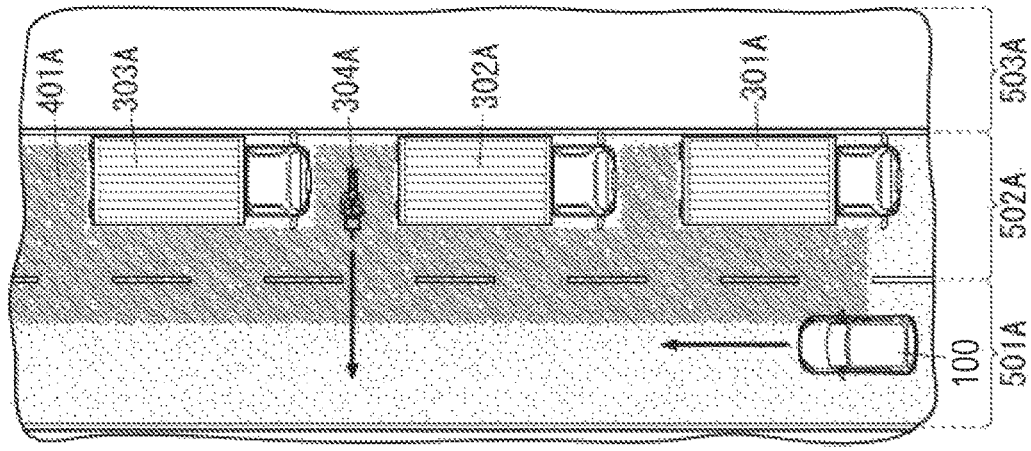
FIG. 8A is a conceptual view showing an example of an event that can be predicted by the event prediction system shown in FIG. 1.

FIGS. 8A, 8B, and 8C each show a situation in which a bicycle, vehicle, pedestrian, or the like can rush out from behind a parked truck as a target object.

In the example in FIG. 8A, driving lane 501A on which mobile object 100 as an own vehicle is traveling and opposite lane 502A each are a one-lane road. Trucks 301A, 302A, and 303A are parked on a road shoulder of opposite lane 502A. In addition, bicycle 304A tries to cross driving lane 501A from sidewalk 503A along opposite lane 502A, traveling through between truck 302A and truck 303A. In such a situation, event prediction systems 1A to 1D each determine, from information such as a distance between trucks 301A and 302A or between trucks 302A and 303A, that an "invisible danger" is lurking near truck 301A, 302A, or 303A. Accordingly, event prediction systems 1A to 1D each display marker 401A in a region adjacent to trucks 301A, 302A, and 303A. Such a situation is not limited to the case in which trucks 301A, 302A, and 303A are parked. For example, such a situation can occur in a case in which a plurality of trucks 301A, 302A, and 303A stop or travel very slowly because of a traffic jam.

In the example in FIG. 8B, driving lane 501B on which mobile object 100 as the own vehicle is traveling and opposite lane 502B each are a two-lane road. Because a red light of traffic light 504B is on, trucks 301B and 302B are stopped (wait for the traffic light) ahead of mobile object 100 on driving lane 501B on the left. In addition, truck 303B is traveling on opposite lane 502B. Furthermore, vehicle 304B tries to run out to opposite lane 502B from parking space 505B on sidewalk 503B along driving lane 501B, traveling through between truck 301B and truck 302B. In such a situation, event prediction systems 1A to 1D each determine, from information such as a distance between trucks 301B and 302B and traffic light 504B, that an "invisible danger" is lurking near truck 301B. Accordingly, event prediction systems 1A to 1D each display marker 401B in a region adjacent to truck 301B.

In the example in FIG. 8C, driving lane 501C on which mobile object 100 as the own vehicle is traveling and opposite lane 502C each are a one-lane road. Truck 301C is parked on a road shoulder of driving lane 501C. In addition, pedestrian 302C is crossing pedestrian crosswalk 504C ahead of truck 301C toward sidewalk 503C along opposite lane 502C. In such a situation, event prediction systems 1A to 1D each determine, from information such as a moving velocity of truck 301C and pedestrian crosswalk 504C, that an "invisible danger" is lurking near truck 301C. Accordingly, event prediction systems 1A to 1D each display marker 401C in a region adjacent to truck 301C.

Figure 9C:
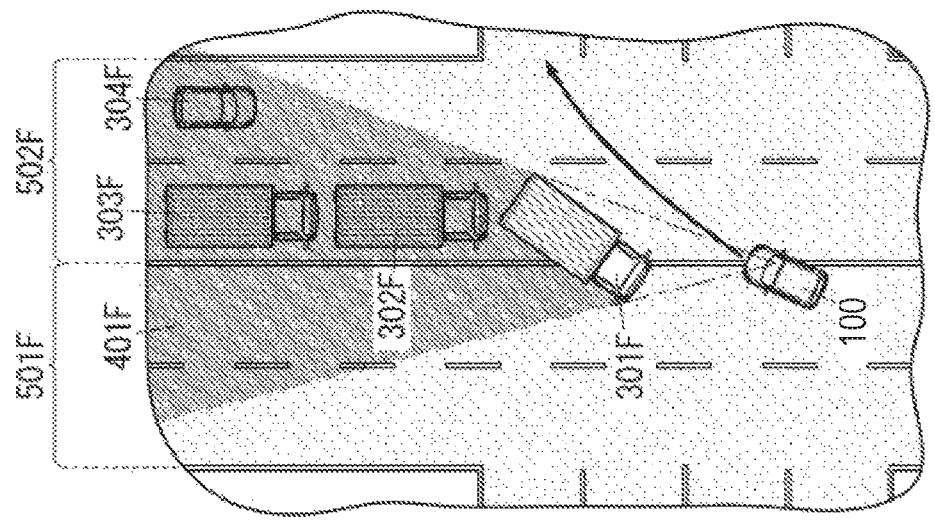
FIG. 9C is a conceptual view showing still another example of the event that can be predicted by the event prediction system shown in FIG. 1.
Figure 9B:
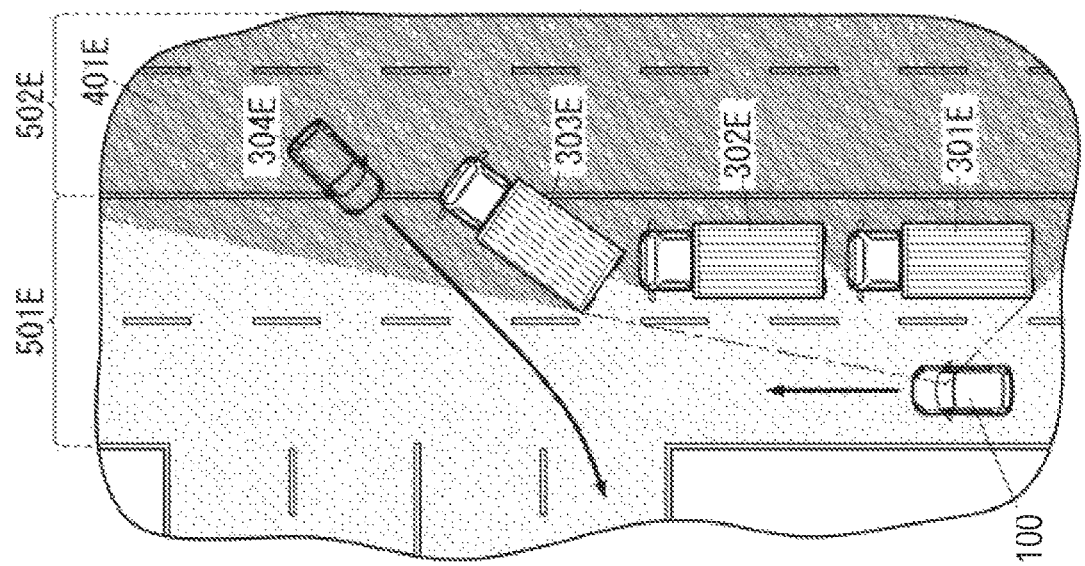
FIG. 9B is a conceptual view showing still another example of the event that can be predicted by the event prediction system shown in FIG. 1.
Figure 9A:
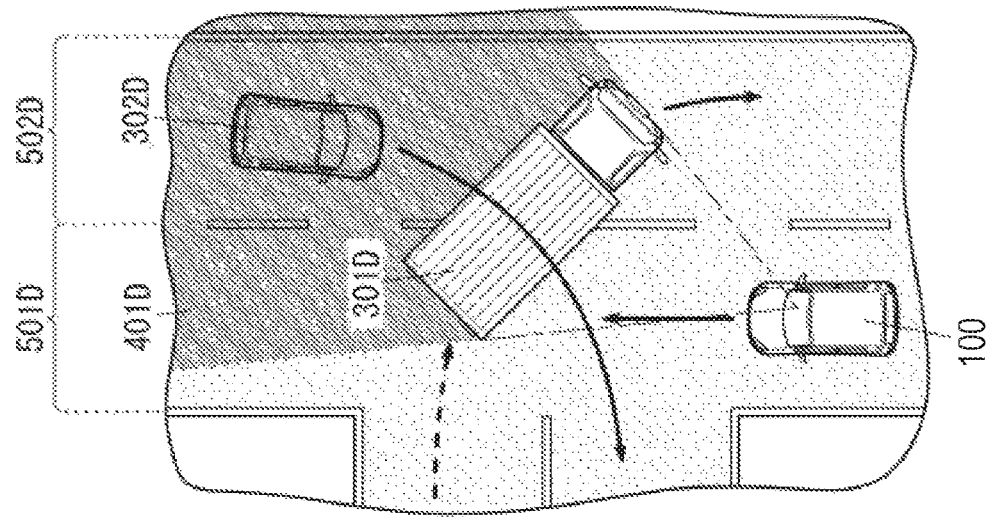
FIG. 9A is a conceptual view showing still another example of the event that can be predicted by the event prediction system shown in FIG. 1.

FIGS. 9A, 9B, and 9C each show a situation in which a vehicle exists in a blind spot caused by a truck as a target object.

In an example in FIG. 9A, driving lane 501D on which mobile object 100 as the own vehicle is traveling and opposite lane 502D each are a one-lane road. Truck 301D is turning right from a left side at an intersection ahead of mobile object 100. On opposite lane 502D, vehicle 302D is waiting to turn right within the same intersection. In such a situation, event prediction systems 1A to 1D each determine, for example, from information concerning truck 301D and vehicle 302D, that an "invisible danger" is lurking in a blind spot caused by truck 301D. Accordingly, event prediction systems 1A to 1D each display marker 401D in a blind spot region generated by truck 301D.

In an example in FIG. 9B, driving lane 501E on which mobile object 100 as the own vehicle is traveling and opposite lane 502E each are a two-lane road. A plurality of trucks 301E, 302E, and 303E are waiting to turn right on driving lane 501E at an intersection ahead of mobile object 100. In addition, vehicle 304E is waiting to turn right within the same intersection on opposite lane 502E. In such a situation, event prediction systems 1A to 1D each determine, for example, from information concerning trucks 301E, 302E, and 303E and vehicle 304E, that an "invisible danger" is lurking in a blind spot caused by trucks 301E, 302E, and 303E. Event prediction systems 1A to 1D each display marker 401E in a blind spot region generated by trucks 301E, 302E, and 303E.

In an example in FIG. 9C, driving lane 501F on which mobile object 100 as the own vehicle is traveling and opposite lane 502F each a two-lane road. Mobile object 100 is waiting to turn right within an intersection. In addition, a plurality of trucks 301F, 302F, and 303F are waiting to turn right on opposite lane 502F at the same intersection. Furthermore, vehicle 304F is traveling straight on opposite lane 502F. In such a situation, event prediction systems 1A to 1D each determine, for example, from information concerning leading truck 301F and vehicle 304F, that an "invisible danger" is lurking in a blind spot caused by leading truck 301F. Accordingly, event prediction systems 1A to 1D each display marker 401F in a blind spot region generated by truck 301F.

(Modification)

The first to fourth exemplary embodiments each are merely one of various exemplary embodiments of the present disclosure. These exemplary embodiments can be variously modified in accordance with designs and the like as long as the object of the present disclosure can be achieved. In addition, functions similar to those of event prediction systems 1A to 1D each may be implemented by, for example, an event prediction method, a computer program, or a storage medium storing a program.

That is, an event prediction method according to an aspect of the present disclosure is configured to store a plurality of pieces of learning data including history information representing situations of mobile object 100 at occurrence of events associated with driving of mobile object 100. A prediction model is generated by using these pieces of learning data. A prediction model is a model for predicting relative coordinates of an occurrence place of an event relative to mobile object 100. The plurality of pieces of learning data each further include label information representing the relative coordinates of the occurrence place of the event relative to mobile object 100.

A program (computer program) according an aspect of the present disclosure is a program for causing a computer system to execute an accumulation process and a generation process. In the accumulation process, the computer system accumulates a plurality of pieces of learning data including history information representing situations of mobile object 100 at occurrence of events associated with driving of mobile object 100. In the generation process, the computer system generates a prediction model for predicting relative coordinate of an occurrence place of an event relative to mobile object 100 by using the plurality of pieces of learning data. The plurality of pieces of learning data each further include label information representing the relative coordinates of the occurrence place of the event relative to mobile object 100.

An event prediction method according to another aspect of the present disclosure includes a first acquisition process, a second acquisition process, and an estimation process. In the first acquisition process, time information is acquired, which represents a required time until a prediction time point when an event associated with driving of mobile object 100 is predicted to occur. In the second acquisition process, mobile object information representing a situation of mobile object 100 is acquired. In the estimation process, an occurrence place of an event is estimated on the basis of the time information and the mobile object information. A program (computer program) according to another aspect of the present disclosure causes a computer system to execute a first acquisition process, a second acquisition process, and an estimation process.

Modifications of the first to fourth exemplary embodiments will be described below. Modifications described below can be combined with each other as needed.

In the first to fourth exemplary embodiments, an estimation result on an occurrence place of an event may be output to, for example, a vehicle control system configured to control mobile object 100 instead of being notified by notification unit 13. In this case, the vehicle control system can decelerate mobile object 100 or avoid the occurrence place of the event before occurrence of the event by operating a brake, accelerator, steering, or the like in accordance with the estimation result on the occurrence place of the event. This allows the vehicle control system to achieve automatic driving (including both fully automatic driving and partially automatic driving).

Event prediction systems 1A to 1D each need not always be implemented by separate systems including mobile object 100 and cloud 200. For example, event prediction systems 1A to 1D each may be accommodated in one housing or may be integrated into mobile object 100 or cloud 200. For example, when event prediction systems 1A to 1D each are integrated into mobile object 100, event prediction systems 1A to 1D each allow mobile object 100 to generate a prediction model in a stand-alone manner. In this case, for example, an electrically erasable and programmable read-only memory (EEPROM) and an electronic control unit (ECU) incorporated in mobile object 100 respectively function as accumulation unit 121 and generator 122. The respective constituent elements (for example, accumulation unit 121, generator 122, and coordinate prediction unit 111A or estimator 117, and time prediction unit 111B) of each of event prediction systems 1A to 1D may be dispersedly provided in two or more apparatuses. For example, generator 122 may be dispersedly provided in mobile object 100 and cloud 200. In each of event prediction systems 1C and 1D, time prediction unit 111B may be dispersedly provided in mobile object 100 and cloud 200.

Learning block 12 is not limited to a configuration for acquiring history information as learning data from one mobile object 100 and may acquire (collect) the history information from a plurality of mobile objects 100. In this case, learning block 12 generates a prediction model by using the history information acquired from the plurality of mobile objects 100 and transmits the generated prediction model to the plurality of mobile objects 100. When learning block 12 acquires history information as learning data from many mobile objects 100, in particular, a set of acquired history information constitutes so-called big data.

Learning block 12 may also be installed in, for example, a shop for sale of automobiles and maintenance. In this case, learning block 12 can acquire history information from a plurality of mobile objects 100 maintained in the shop. A prediction model generated by learning block 12 is transmitted to prediction block 11A at the time of maintenance of mobile object 100. This allows mobile object 100 to update the prediction model at the time of maintenance. In addition, learning block 12 may be implemented by a server apparatus in a vendor or manufacturer that manages a plurality of shops. In this case, learning block 12 can collectively manage history information acquired from a plurality of shops and generate a prediction model by using these pieces of history information.

Notification unit 13 is not limited to a configuration for implementing augmented reality display by using 3D-HUD 131 and may perform, for example, text display or animation display by using 2D-HUD 132, meter 133, multi-information display 134, or the like. In addition, notification unit 13 may implement augmented reality display by displaying a video obtained by combining a maker with a video captured in real time by a front camera on a display of a car navigation system or the like. Furthermore, notification unit 13 may include a display unit formed from a wearable terminal such as a head mounted display (HMD).

Notification unit 13 is not limited to a configuration for notifying of an occurrence place of an event by display and may be configured to notify of the occurrence place of the event by, for example, sound, a haptic device, or a combination of them. In addition, a target of notification by notification unit 13 is not limited to a driver of mobile object 100. For example, notification unit 13 may notify, for example, a car traveling behind mobile object 100 and a pedestrian near mobile object 100 by turning on lighting appliances or horn beeping.

Events predicted by event prediction systems 1A to 1D are not limited to events (invisible dangers) originating from target objects in blind spots of drivers. Event prediction systems 1A to 1D each may predict occurrence places of events that can be predicted regardless of situations of mobile object 100, such as high accident locations, entrances and exits of tunnels, and sharp corners.

Event prediction systems 1A to 1D are not limited to vehicles and may be applied to mobile objects other than vehicles, such as motorcycles, trains, aircrafts, drones, construction machines, and ships. In addition, event prediction system 1A is not limited to a mobile object and may be used in amusement facilities or may be used as a wearable terminal such as an HMD, medical equipment, or stationary apparatus.

Event prediction systems 1A and 1B according to the first and second exemplary embodiments are at least required to generate a prediction model for predicting relative coordinates of an occurrence place of an event relative to mobile object 100. Accordingly, a function of predicting relative coordinates from a prediction model is not an essential function for event prediction systems 1A and 1B. For this reason, event prediction systems 1A and 1B each may be configured to, for example, provide a prediction model for another system configured to predict relative coordinates of an event relative to mobile object 100 from the prediction model. That is, coordinate prediction unit 111A for predicting relative coordinates by using a prediction model and the like are not essential constituent elements of event prediction systems 1A and 1B.

Likewise, event prediction systems 1C and 1D according to the third and fourth exemplary embodiments each are at least required to have a function of estimating an occurrence place of an event on the basis of time information representing a required time until a prediction time point when an event is predicted to occur. Accordingly, a function of predicting the required time is not an essential function for event prediction systems 1C and 1D. For this reason, event prediction systems 1C and 1D each may be configured to acquire the required time from, for example, another system. That is, time prediction unit 111B for predicting the required time by using a prediction model, accumulation unit 121 for accumulating learning data, generator 122 for generating a prediction model, and the like are not essential constituent elements for event prediction systems 1C and 1D.

In the first and second exemplary embodiments, coordinate prediction unit 111A is not limited to a configuration for transmitting label information to learning block 12, and a unit other than coordinate prediction unit 111A in prediction block 11A may transmit label information to learning block 12. In addition, prediction block 11A provided for mobile object 100 may add label information as relative coordinates to history information. In this case, learning block 12 occasionally accumulates history information with label information received from prediction block 11A in accumulation unit 121. In addition, learning block 12 is not limited to a configuration for receiving the label information from prediction block 11A, and may be configured to generate the label information by using history information received from prediction block 11A. In this case, learning block 12 executes both generation of the label information and addition of the label information to the history information.

Likewise, the third and fourth exemplary embodiments are not limited to a configuration for causing time prediction unit 111B to transmit label information to learning block 12, and a unit other than time prediction unit 111B in prediction block 11B may transmit the label information to learning block 12. In addition, prediction block 11B provided for mobile object 100 may add time information as the label information to history information. In this case, learning block 12 occasionally accumulates the history information with the label information received from prediction block 11B in accumulation unit 121. In addition, instead of using a configuration for transmitting the label information from prediction block 11B to learning block 12, learning block 12 may generate the label information by using the history information received from prediction block 11B. In this case, learning block 12 executes both generation of the label information and addition of the label information to the history information.

In the first and second exemplary embodiments, prediction information may be information representing a situation of mobile object 100, and may not be the same information as mobile object information acquired by first processor 113. For example, a moving velocity of mobile object 100 which is included in vehicle information in prediction information may be replaced by a moving velocity calculated from position information in mobile object information. Likewise, history information may be information representing a situation of mobile object 100, and may not be the same information as mobile object information acquired by first processor 113.

Likewise, in the third and fourth exemplary embodiments, prediction information may be information representing a situation of mobile object 100, and may not be the same information as mobile object information acquired by second acquisition unit 116. For example, a moving velocity of mobile object 100 which is included in vehicle information in prediction information may be replaced by a moving velocity calculated from position information in mobile object information. Likewise, history information may be information representing a situation of mobile object 100, and may not be the same information as mobile object information acquired by second acquisition unit 116.

Estimation by coordinate prediction unit 111A according to the first and second exemplary embodiments or by estimator 117 according to the third and fourth exemplary embodiments and determination whether to execute notifying by notification unit 13 may be selectively performed on the basis of, for example, a condition (including a mental condition) of a driver. For example, when a degree of concentration of a driver becomes lower than normal because of, for example, fatigue and lack of sleep of the driver, the driver sometimes becomes difficult to recognize possibility of occurrence of an event. Accordingly, each exemplary embodiment may be configured to cause coordinate prediction unit 111A or estimator 117 to execute the estimation when, for example, it is determined, from acceleration applied to mobile object 100 and a detection result obtained by a driver monitor, included in vehicle information, that the driver is driving more roughly than usual. In addition, each exemplary embodiment may be configured to cause notification unit 13 to execute notification when, for example, it is determined, from a detection result obtained by the driver monitor, that the driver does not recognize possibility of occurrence of an event. Furthermore, a level at which notification unit 13 performs notification may be changed on the basis of a condition and the like of the driver.

Coordinate prediction unit 111A is not limited to a configuration for estimating an object existing adjacent to mobile object 100 at a position indicated by relative coordinates as an occurrence place of an event, and may estimate a place where an event occurs, such as an intersection or crosswalk, as an occurrence place of an event.

Likewise, estimator 117 is not limited to a configuration for estimating an object that exists adjacent to mobile object 100 and will exist at an arrival position after a predetermined time as an occurrence place of an event, and may estimate a place where an event occurs, such as an intersection or crosswalk, as an occurrence place of an event.

Relative coordinates of an occurrence place of an event relative to mobile object 100 are not limited to coordinates in a two-dimensional coordinate system, and may be, for example, coordinates in a polar coordinate system or in a three-dimensional coordinate system to which a height direction (vertical direction) of mobile object 100 is added as a Z-axis.

Notification unit 13 is at least required to be configured to notify of an event prediction result on the basis of relative coordinate, and is not limited to a configuration for notifying of an occurrence place of an event estimated from relative coordinate as an event prediction result. For example, when a distance from mobile object 100 to a position indicated by predicted relative coordinates is less than or equal to specified distance D, notification unit 13 may be configured to simply make an alert or notify of the distance. In addition, notification unit 13 may notify of a required time until an occurrence time point of an event which is predicted from relative coordinates, mobile object information, and the like.

Event prediction systems 1A to 1D each may use a so-called vehicle to everything (V2X) communication technology configured to perform direct communication between vehicles (inter-vehicle communication) or between a vehicle and an infrastructure such as a traffic light and a road sign. For example, the V2X communication technology allows mobile object 100 to acquire prediction information and the like used by coordinate prediction unit 111A to predict relative coordinates from an adjacent vehicle or infrastructure. Alternatively, this technology allows mobile object 100 to acquire prediction information and the like used by time prediction unit 111B to predict a required time from an adjacent vehicle or infrastructure. In addition, an infrastructure can notify of an occurrence place of an event instead of notification unit 13. An infrastructure may, for example, estimate an occurrence place of an event. In this case, any of event prediction systems 1A to 1D need not be mounted in mobile object 100.

The drawing referred to in each of the exemplary embodiments is merely a conceptual view for explaining an example of each of event prediction systems 1A to 1D. That is, the shape, size, positional relationship, and the like shown in each drawing are made to differ from those in an actual aspect as needed.

Either of event prediction systems 1A and 1B according to the first and second exemplary embodiments may be combined with either of event prediction systems 1C and 1D according to the third and fourth exemplary embodiments. In this case, because an occurrence place of an event is predicted by different methods, prediction accuracy and reliability are improved.

(Overview)

As described above, event prediction systems 1A and 1B according to the first and second exemplary embodiments each include accumulation unit 121 and generator 122. Accumulation unit 121 accumulates a plurality of pieces of learning data including history information representing a situation of mobile object 100 at occurrence of an event associated with driving of mobile object 100. Generator 122 generates a prediction model for predicting relative coordinates of an occurrence place of an event relative to mobile object 100 by using a plurality of pieces of learning data. The plurality of pieces of learning data each further include label information representing the relative coordinates of the occurrence place of the event relative to mobile object 100.

According to this configuration, a prediction model for predicting relative coordinates of an occurrence place of an event relative to mobile object 100 is generated. Using this prediction model makes it possible to predict an occurrence of an event (invisible danger) originating from a target object in a blind spot of a driver. Accordingly, event prediction systems 1A and 1B each can reduce variations in predictability of an "invisible danger" originating from a level of driving skill of a driver, innate sense of driving, a condition of the driver, and the like. This allows even a driver having relatively little driving experience to drive in consideration of possibility occurrence of such types of events. In addition, even a driver whose concentration is lower than usual due to, for example, fatigue and lack of sleep can drive in consideration of possibility of occurrence of such types of events. Furthermore, when, for example, a driver simply looks away or becomes distracted, he/she can be delayed in recognition of occurrence of an event. In such a situation, the driver can quickly recognize possibility of occurrence of an event, and hence can drive more safely.

In each of event prediction systems 1A and 1B, history information may include at least one of information concerning an object adjacent to mobile object 100, information concerning a condition of mobile object 100, and information concerning a position of mobile object 100.

According to this configuration, event prediction systems 1A and 1B each generate a prediction model for predicting relative coordinates by using at least one of the ADAS information, the vehicle information, and the position information. This makes it possible to reduce a processing load applied to generation of a prediction model to a relatively low level.

Event prediction systems 1A and 1B each may further include coordinate prediction unit 111A for predicting relative coordinates of an occurrence place of an event relative to mobile object 100 by using a prediction model and prediction information concerning mobile object 100.

According to this configuration, event prediction systems 1A and 1B predict the relative coordinates, and hence need not externally provide any prediction models. That is, event prediction systems 1A and 1B each can complete a process for predicting occurrence of an event by itself.

Event prediction systems 1A and 1B each may further include notification unit 13 for notifying of an event prediction result on the basis of the relative coordinates predicted by coordinate prediction unit 111A.

This configuration is configured to notify of the event prediction result, and hence allows a driver or the like to drive with caution about occurrence of events.

Notification unit 13 may be configured to notify of an occurrence place of an event estimated from relative coordinates as an event prediction result.

This configuration is configured to notify of the occurrence place of the event estimated from the relative coordinates, and hence allows a driver or the like to drive with caution about the occurrence place of the event.

Notification unit 13 may include a display unit for notifying of an event prediction result by display.

This configuration is configured to display the event prediction result by display, and hence allows a driver or the like to easily specify the occurrence place of the event.

As described concerning event prediction system 1B, coordinate prediction unit 111A may be configured to use a different prediction model for attributes of each driver who drives mobile object 100.

This configuration improves prediction accuracy of relative coordinates by coordinate prediction unit 111A as compared with a case using a universally applicable prediction model.

Event prediction systems 1A and 1B each include coordinate prediction unit 111A for predicting an occurrence place of an event. Coordinate prediction unit 111A predicts an occurrence place of an event by using prediction information concerning mobile object 100 and a prediction model for predicting relative coordinates of an occurrence place of an event associated with driving of the mobile object 100 relative to mobile object 100.

According to this configuration, using the prediction model makes it possible to predict the relative coordinates of the occurrence place of the event relative to mobile object 100. Accordingly, event prediction systems 1A and 1B each can predict occurrence of an event (invisible danger) originating from a target object in a blind spot of a driver.

Event prediction systems 1C and 1D according to the third and fourth exemplary embodiments each include first acquisition unit 115, second acquisition unit 116, and estimator 117. First acquisition unit 115 acquires time information representing a required time until a prediction time point when an event associated with driving of mobile object 100 is predicted. Second acquisition unit 116 acquires mobile object information representing a situation of mobile object 100. Estimator 117 estimates an occurrence place of an event on the basis of the time information and the mobile object information.

According to this configuration, an occurrence place of an event is predicted on the basis of a required time until a prediction time point when an event is predicted to occur and a situation of mobile object 100. Accordingly, event prediction systems 1C and 1D each can also predict occurrence of an event (invisible danger) originating from a target object in a blind spot of a driver. That is, event prediction systems 1C and 1D have the same effects as those of event prediction systems 1A and 1B.

Event prediction systems 1C and 1D each estimate an occurrence place of an event by using a one-dimensional parameter called the required time until the prediction time point. This makes it possible to reduce a processing load applied to the estimation of the occurrence place of the event to a relatively low level.

In each of event prediction systems 1C and 1D, mobile object information may include at least one of information concerning an object adjacent to mobile object 100, information concerning a condition of mobile object 100, and information concerning a position of mobile object 100.

According to this configuration, event prediction systems 1C and 1D estimate an occurrence place of an event by using at least one of the ADAS information, the vehicle information, and the position information. This makes it possible to reduce a processing load applied to the estimation of the occurrence place of the event to a relatively low level.

In each of event prediction systems 1C and 1D, estimator 117 may be configured to predict an arrival position of mobile object 100 at a prediction time point on the basis of time information and mobile object information. In this case, estimator 117 estimates an occurrence place of an event from the arrival position.

According to this configuration, the occurrence place of the event is estimated from the arrival position of mobile object 100 at the prediction time point, and hence estimation accuracy of the occurrence place of the event is improved.

Estimator 117 may estimate, as the occurrence place of the event, an object that exists adjacent to mobile object 100 and will exist at an arrival position after a required time.

According to this configuration, the object that will exist at the arrival position after the required time is estimated as the occurrence place of the event. Therefore, for example, even if an object as a target for an event has moved, the object can be estimated as the target for the event.

Event prediction systems 1C and 1D may further include notification unit 13 for notifying of an occurrence place of an event estimated by estimator 117. In addition, notification unit 13 may include a display unit for notifying of an occurrence place of an event by display. These configurations have the same effects as those of notification unit 13 of each of event prediction systems 1A and 1B.

Event prediction systems 1C and 1D may further include time prediction unit 111B for predicting a required time. Time prediction unit 111B predicts the required time by using prediction time concerning mobile object 100 and a prediction model.

According to this configuration, event prediction systems 1C and 1D each predict the required time, and hence need not externally provide any required time. That is, event prediction systems 1C and 1D each can complete a process for predicting an occurrence place of an event by itself.

Time prediction unit 111B may be configured to use a different prediction model for attributes of each driver who drives mobile object 100.

This configuration has the same effects as those of event prediction system 1B. That is, the configuration improves prediction accuracy of the required time by time prediction unit 111B as compared with a case using a universally applicable prediction model.

On the other hand, event prediction systems 1C and 1D each include accumulation unit 121 and generator 122. Accumulation unit 121 accumulates a plurality of pieces of learning data including history information representing a situation of mobile object 100 at occurrence of an event associated with driving of mobile object 100. Generator 122 generates a prediction model for predicting a required time until a prediction time point when an event is predicted to occur by using the plurality of pieces of learning data. The plurality of pieces of learning data each further include label information representing a required time until an occurrence time point of an event.

This configuration generates the prediction model for predicting the required time until the prediction time point when the event is predicted to occur. Using this prediction model allows event prediction systems 1C and 1D to predict occurrence of an event (invisible danger) originating from a target object in a blind spot of a driver.

Event prediction methods according to the first and second exemplary embodiments each are configured to accumulate a plurality of pieces of learning data including history information representing a situation of mobile object 100 at occurrence of an event associated with driving of mobile object 100. A prediction model is generated by using the plurality of pieces of learning data. The prediction model is a model for predicting relative coordinates of an occurrence place of an event relative to mobile object 100. The plurality of pieces of learning data each further include label information representing the relative coordinates of the occurrence place of the event relative to mobile object 100.

According to this method, the prediction model for predicting the relative coordinates of the occurrence place of the event relative to mobile object 100 is generated. Using this prediction model makes it possible to predict occurrence of an event (invisible danger) originating from a target object in a blind spot of a driver. Accordingly, this method can reduce variations in predictability of an "invisible danger" originating from a level of driving skill of a driver, innate sense of driving, a condition of the driver, and the like.

Event prediction methods according to the third and fourth exemplary embodiments each include a first acquisition process, a second acquisition process, and an estimation process. In the first acquisition process, time information is acquired, which represents a required time until a prediction time point when an event associated with driving of mobile object 100 is predicted to occur. In the second acquisition process, mobile object information representing a situation of mobile object 100 is acquired. In the estimation process, an occurrence place of an event is estimated on the basis of the time information and the mobile object information.

According to this method, the occurrence place of the event is estimated on the basis of the required time until the prediction time when the event is predicted to occur and the condition of mobile object 100. Therefore, this method also makes it possible to predict occurrence of an event (invisible danger) originating from a target object in a blind spot of a driver. Accordingly, it is possible to obtain the same effects as those of the methods according to the first and second exemplary embodiments. In addition, this method is configured to estimate an occurrence place of an event by using a one-dimensional parameter called the required time until the prediction time point. This makes it possible to reduce a processing load applied to the estimation of the occurrence place of the event to a relatively low level.

Programs according to the first and second exemplary embodiments each cause a computer system to execute an accumulation process and a generation process. In the accumulation process, the computer system accumulates a plurality of pieces of learning data including history information representing situations of mobile object 100 at occurrence of events associated with driving of mobile object 100. In the generation process, the computer system generates a prediction model for predicting relative coordinate of an occurrence place of an event relative to mobile object 100 by using the plurality of pieces of learning data. The plurality of pieces of learning data each further include label information representing the relative coordinates of the occurrence place of the event relative to mobile object 100.

This program is configured to generate the prediction model for predicting the relative coordinates of the occurrence place of the event relative to mobile object 100. Using this prediction model makes it possible to predict occurrence of an event (invisible danger) originating from a target object in a blind spot of a driver.

Programs according to the third and fourth exemplary embodiments each cause a computer system to execute a first acquisition process, a second acquisition process, and an estimation process. In the first acquisition process, time information is acquired, which represents a required time until a prediction time point when an event associated with driving of mobile object 100 is predicted to occur. In the second acquisition process, mobile object information representing a situation of mobile object 100 is acquired. In the estimation process, an occurrence place of an event is estimated on the basis of the time information and the mobile object information.

This program is configured to estimate the occurrence place of the event on the basis of the required time until the prediction time point when the event is predicted to occur and the condition of mobile object 100. Accordingly, this program also makes it possible to predict occurrence of an event (invisible danger) originating from a target object in a blind spot of a driver. In addition, this program is configured to estimate an occurrence place of an event by using a one-dimensional parameter called the required time until the prediction time point. This makes it possible to reduce a processing load applied to the estimation of the occurrence place of the event to a relatively low level.

The event prediction system, the event prediction method, the program, and the recording medium according to the present disclosure make it possible to predict occurrence of an event originating from a target object in a blind spot of a driver. This contributes to improvement in safety of a mobile object such as an automobile.

What is claimed is:

1. An event prediction system comprising:
    a server device configured to
        accumulate a plurality of pieces of learning data each including history information representing a situation of a mobile object at occurrence of an event associated with driving of the mobile object, and
    generate a first prediction model for prediction of relative coordinates of an occurrence place of the event relative to the mobile object by using the plurality of pieces of learning data; and
    a processor installed in the mobile object, the processor configured to
        predict the relative coordinates of the occurrence place of the event relative to the mobile object by using the first prediction model for prediction of relative coordinates of an occurrence place of the event relative to the mobile object and prediction information concerning the mobile object,
    wherein the processor calculates a distance from the mobile object to the place indicated by the relative coordinates predicted, estimates the occurrence place of the event when the distance is equal to or less than a specified distance, and does not estimate the occurrence place of the event when the distance is greater than the specified distance.

2. The event prediction system according to claim 1, wherein the history information includes at least one of information concerning an object adjacent to the mobile object, information concerning a condition of the mobile object, and information concerning a position of the mobile object.

3. The event prediction system according to claim 1, further comprising a display configured to notify of a prediction result on the event based on the relative coordinates predicted by the processor.

4. The event prediction system according to claim 3, wherein the display notifies of the occurrence place of the event estimated from the relative coordinates as a prediction result on the event.

5. The event prediction system according to claim 3, wherein the display is configured to provide a display of the prediction result on the event.

6. The event prediction system according to claim 1, wherein the processor is configured to use the first prediction model different for an attribute of each driver who drives the mobile object.

7. An event prediction method comprising:
    accumulating a plurality of pieces of learning data each including history information representing a situation of a mobile object at occurrence of an event associated with driving of the mobile object;
    generating a first prediction model for prediction of relative coordinates of an occurrence place of the event relative to the mobile object by using the plurality of pieces of learning data; and
    predicting the relative coordinates of the occurrence place of the event relative to the mobile object by using the first prediction model for prediction of relative coordinates of an occurrence place of the event relative to the mobile object and prediction information concerning the mobile object,
    wherein calculating a distance from the mobile object to the place indicated by the relative coordinates predicted, estimating the place where the event when the distance is equal to or less than a specified distance, and not estimating the occurrence place of the event when the distance is greater than the specified distance.

8. A non-transient recording medium storing a program for causing a computer system to execute
    an accumulation process of accumulating a plurality of pieces of learning data each including history information representing a situation of a mobile object at occurrence of an event associated with driving of the mobile object,
    a generation process of generating a first prediction model for prediction of relative coordinates of an occurrence place of the event relative to the mobile object by using the plurality of pieces of learning data, and
    a coordinate prediction process of predicting the relative coordinates of the occurrence place of the event relative to the mobile object by using the first prediction model for prediction of relative coordinates of an occurrence place of the event relative to the mobile object and prediction information concerning the mobile object,
    wherein the coordinate prediction process of calculating a distance from the mobile object to the place indicated by the relative coordinates predicted, estimating the place where the occurrence place of the event when the distance is equal to or less than a specified distance, and not estimating the place where the occurrence place of the event when the distance is greater than the specified distance.

* * * * *